US011827381B2

(12) United States Patent
Blomquist

(10) Patent No.: US 11,827,381 B2
(45) Date of Patent: Nov. 28, 2023

(54) SPACECRAFT AND CONTROL METHOD

(71) Applicant: Richard Stuart Blomquist, Logan, UT (US)

(72) Inventor: Richard Stuart Blomquist, Logan, UT (US)

(*) Notice: Subject to any disclaimer, the term of this patent is extended or adjusted under 35 U.S.C. 154(b) by 0 days.

(21) Appl. No.: 17/752,017

(22) Filed: May 24, 2022

(65) Prior Publication Data
US 2022/0281619 A1  Sep. 8, 2022

Related U.S. Application Data

(62) Division of application No. 16/309,149, filed as application No. PCT/US2017/037543 on Jun. 14, 2017, now Pat. No. 11,338,942.

(60) Provisional application No. 62/349,941, filed on Jun. 14, 2016.

(51) Int. Cl.
*B64G 1/22* (2006.01)
*B64G 1/40* (2006.01)

(52) U.S. Cl.
CPC .............. *B64G 1/222* (2013.01); *B64G 1/407* (2013.01)

(58) Field of Classification Search
CPC .... B64G 1/222; B64G 1/407; B64G 2700/24; B64G 1/44; B64G 1/242; B64G 1/244
See application file for complete search history.

(56) References Cited

U.S. PATENT DOCUMENTS

| 3,145,948 A | | 8/1964 | Kershner |
| 4,321,299 A | | 3/1982 | Frazer |
| 4,614,319 A | | 9/1986 | Drexler |
| 4,728,061 A | | 3/1988 | Johnson et al. |
| 5,312,073 A | * | 5/1994 | Flament ................. B64G 1/244 244/172.7 |

(Continued)

FOREIGN PATENT DOCUMENTS

| EP | 0372434 | 6/1990 |
| FR | 3021328 A1 * | 11/2015 .............. A61P 37/08 |

(Continued)

OTHER PUBLICATIONS

Richard S. Blomquist "Heliogyro Control" (Year: 2009).*

(Continued)

*Primary Examiner* — Assres H Woldemaryam
(74) *Attorney, Agent, or Firm* — Thomas J. Lavan

(57) ABSTRACT

A method of controlling a spacecraft is provided. The method includes one or more of calculating, by a control device, spacecraft position, attitude, and velocity, the spacecraft including a plurality of blade actuators controlling pitch for a plurality of blades, the plurality of blades extending radially away from a spacecraft core and including material configured to be deflected by solar pressure, receiving mission plan updates for the spacecraft, calculating an updated trajectory based on the position, attitude, velocity, mission plan updates, and past spacecraft behavior, generating maneuver parameters for the spacecraft from the updated trajectory, creating new blade pitch profiles for a plurality of blade actuators, from the maneuver parameters, sending controls corresponding to the new blade pitch (Continued)

Heliogyro Spin Using Strut-Mounted Thrusters profiles to the plurality of blade actuators, and transitioning from current blade pitch profiles to the new blade pitch profiles.

21 Claims, 24 Drawing Sheets

(56) References Cited

U.S. PATENT DOCUMENTS

| | | | |
|---|---|---|---|
| 5,390,288 A | | 2/1995 | Toda et al. |
| 5,697,582 A | | 12/1997 | Surauer et al. |
| 5,850,992 A | * | 12/1998 | Flament .................. B64G 1/407 701/13 |
| 6,158,088 A | | 12/2000 | Bulboaca |
| 6,194,790 B1 | | 2/2001 | Griffin et al. |
| 6,334,344 B1 | * | 1/2002 | Bonhoure .............. G05D 1/101 244/190 |
| 6,565,044 B1 | | 5/2003 | Johnson et al. |
| 6,609,683 B2 | | 8/2003 | Bauer et al. |
| 7,913,953 B2 | | 3/2011 | Ellinghaus |
| 8,683,755 B1 | | 4/2014 | Spence et al. |
| 10,954,004 B2 | * | 3/2021 | Ulrich ....................... B64G 1/40 |
| 2005/0274849 A1 | | 12/2005 | Klosner et al. |
| 2012/0138749 A1 | | 6/2012 | Ellinghaus |
| 2014/0319283 A1 | | 10/2014 | Holemans et al. |

FOREIGN PATENT DOCUMENTS

| | | |
|---|---|---|
| GB | 2434345 | 7/2007 |
| WO | WO 092/09479 | 11/1992 |
| WO | WO 2012/168741 | 12/2012 |
| WO | PCT/US2017/037543 | 11/2017 |

OTHER PUBLICATIONS

Description Translation to English of foreign reference WO092/09479.

Claims Translation to English of foreign reference WO092/09479.

Heliogyro Solar Sailer Summary Report, NASA-CR-1329, ARC-R-0297, Jun. 1969, Richard H. MacNeal, John M. Hedgepeth, Hans U. Schuerch, Astro Research Corporation, Santa Barbara, California.

The Heliogyro, an Interplanetary Flying Machine, ARC-R-249, Mar. 1967, Richard H. MacNeal, Astro Research Corporation, Santa Barbara, California.

* cited by examiner

*Fig. 1 Strut Heliogyro Main Components*
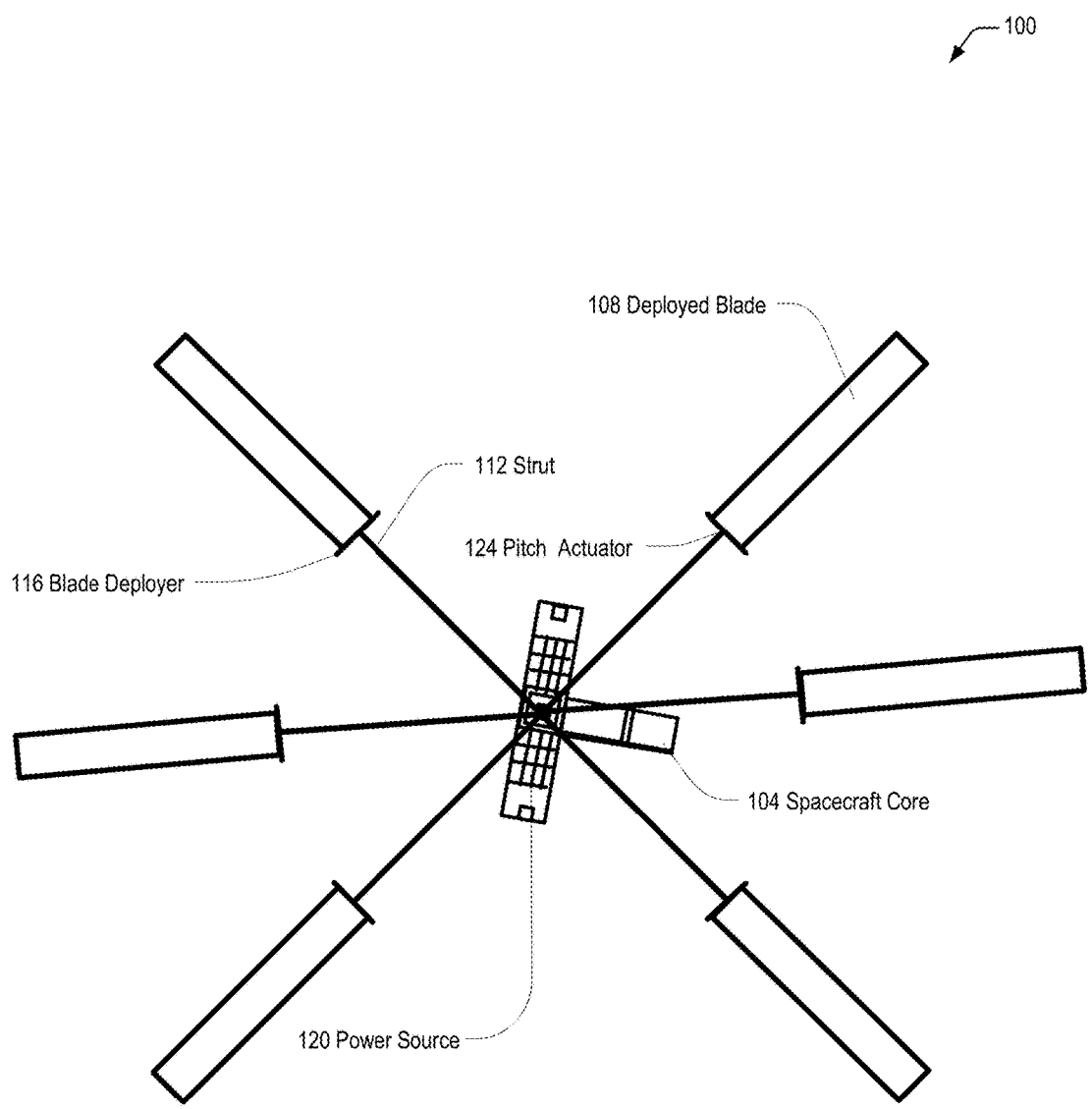

*Fig. 2 Ring Heliogyro Main Components*
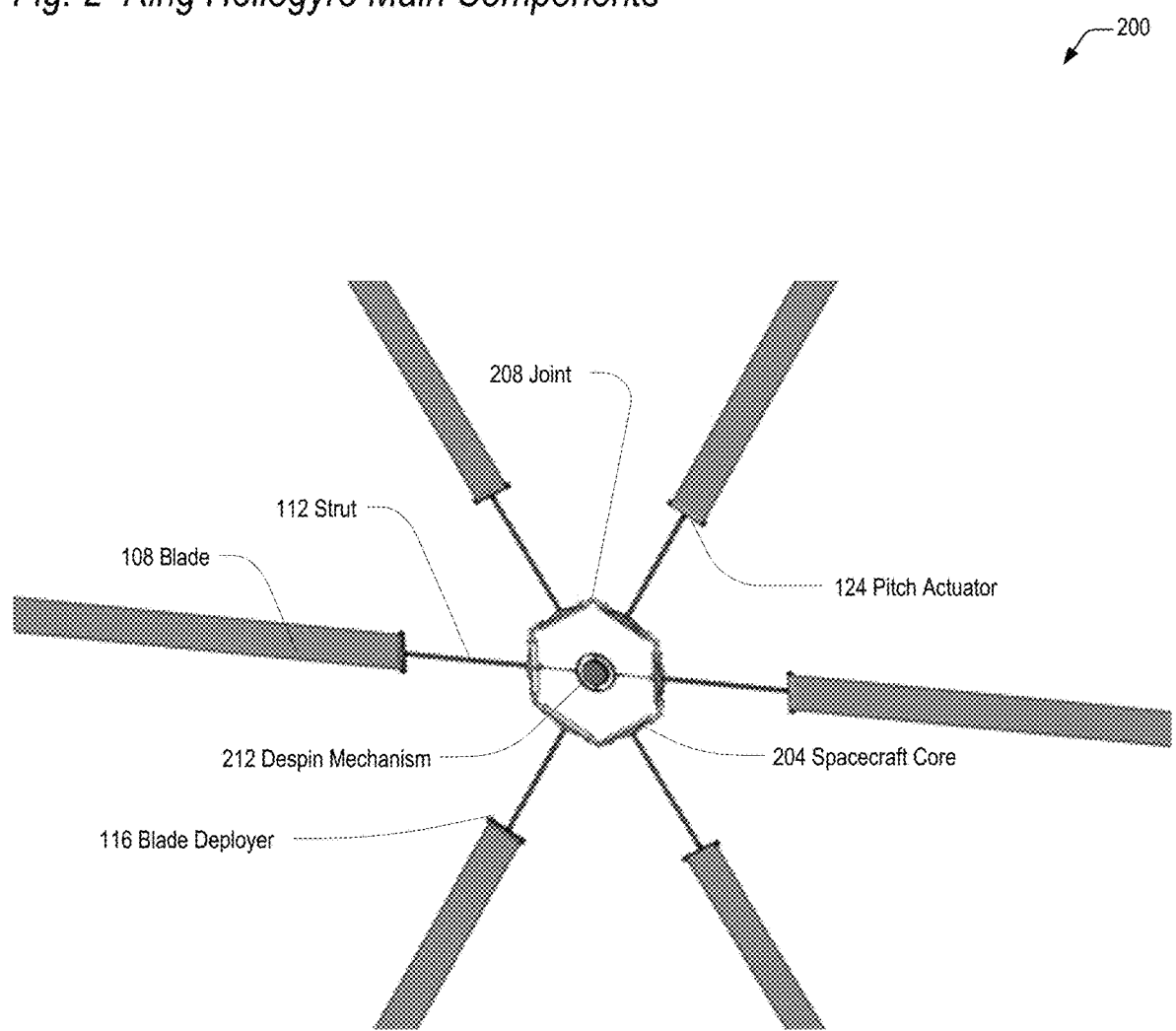

Fig. 3 Heliogyro Spin Using Strut-Mounted Thrusters
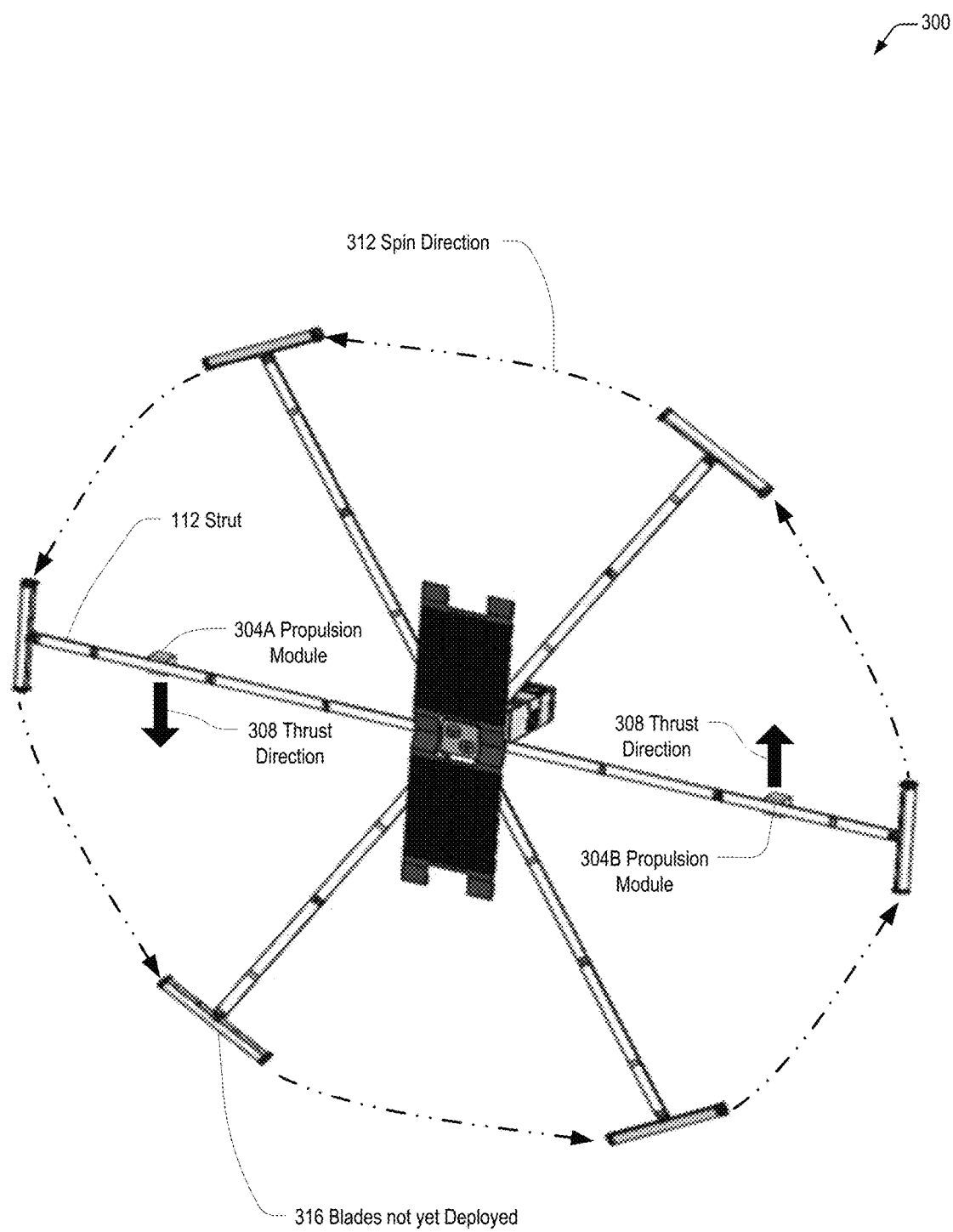

*Fig. 4 Heliogyro Blade Deployer Details*
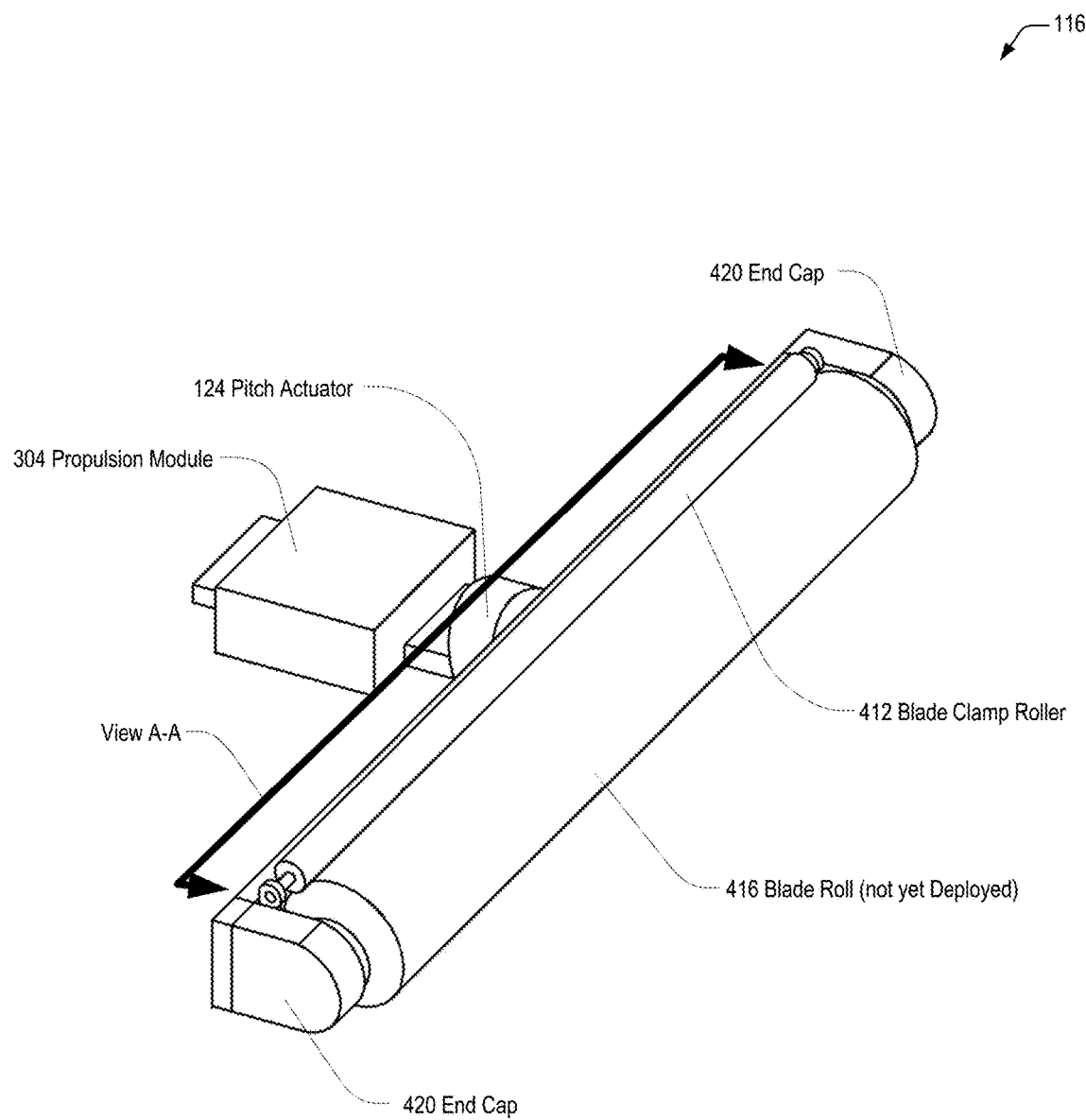

Fig. 5 Heliogyro Spring-Loaded Attachment Point, View A-A
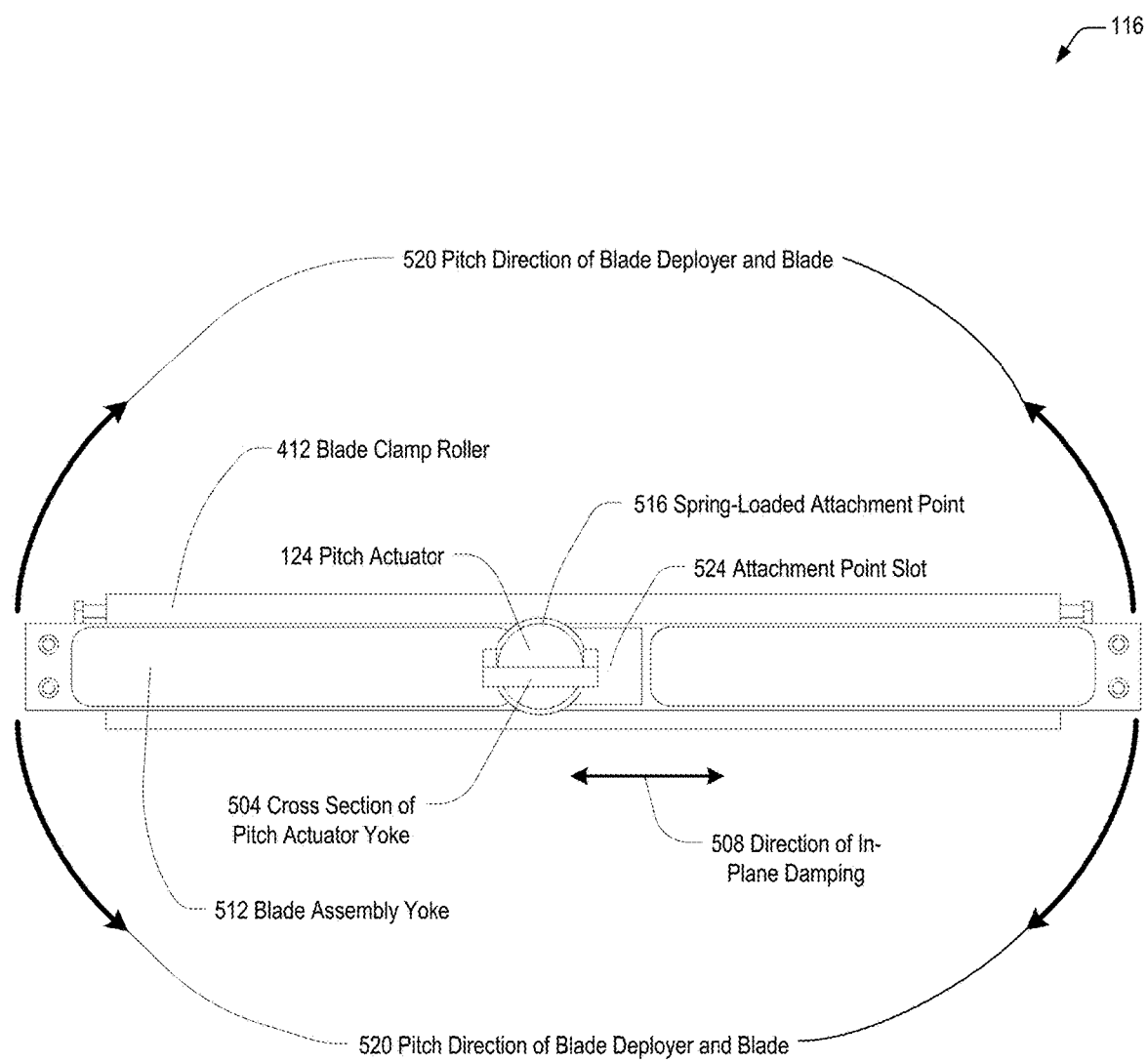

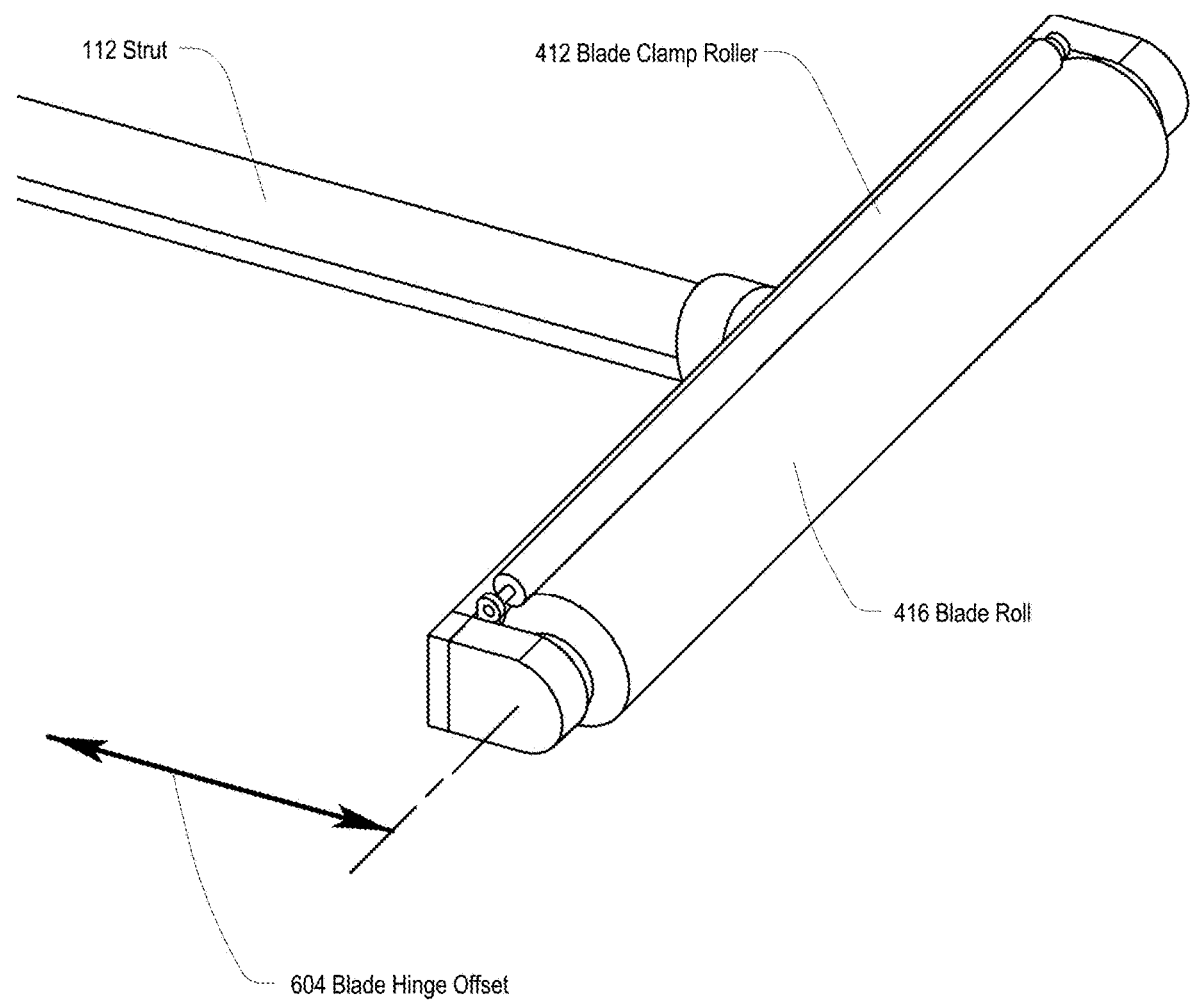
*Fig. 6 Heliogyro Blade Feedout System (with Blade shown)*

Fig. 7 Heliogyro Blade Feedout System (with Blade not shown)
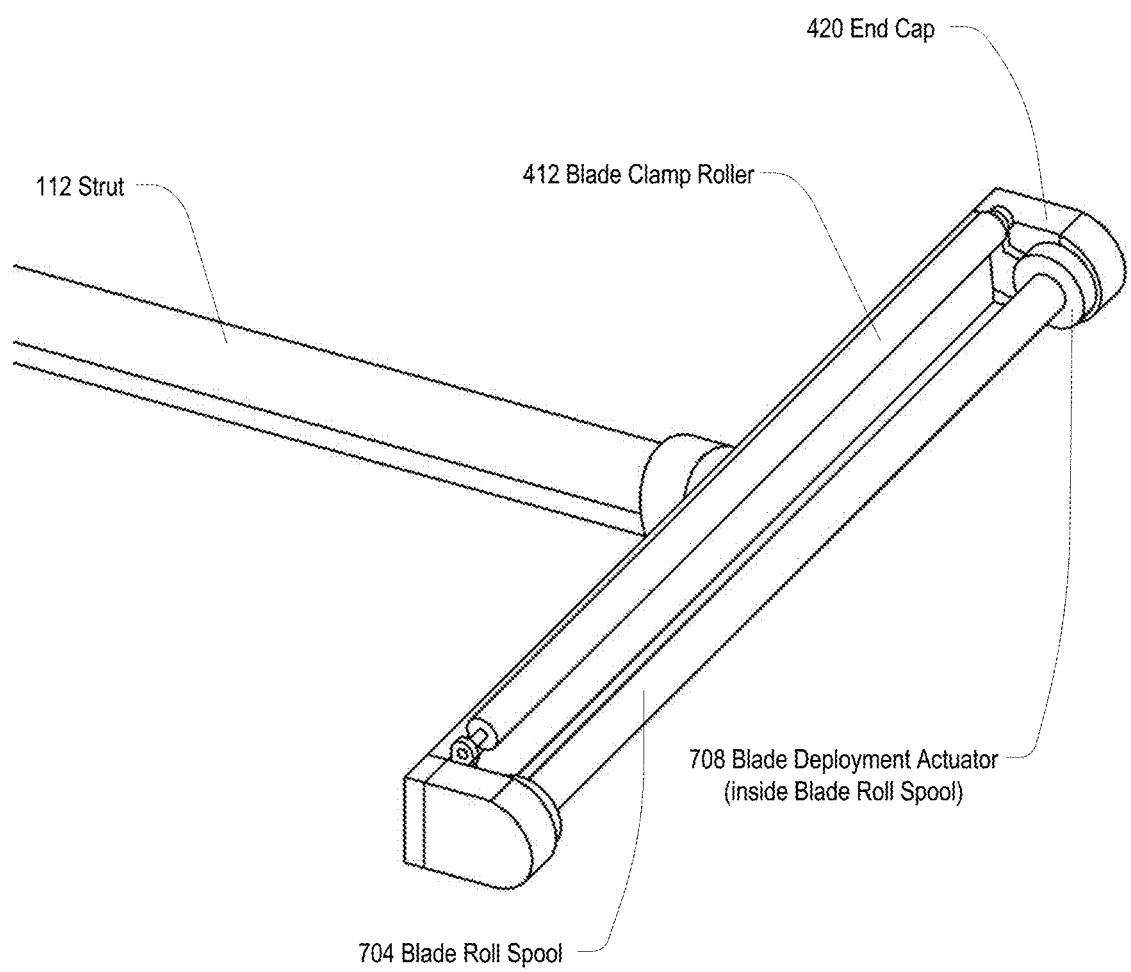

*Fig. 8 Heliogyro Blade Actuator Cross Section*
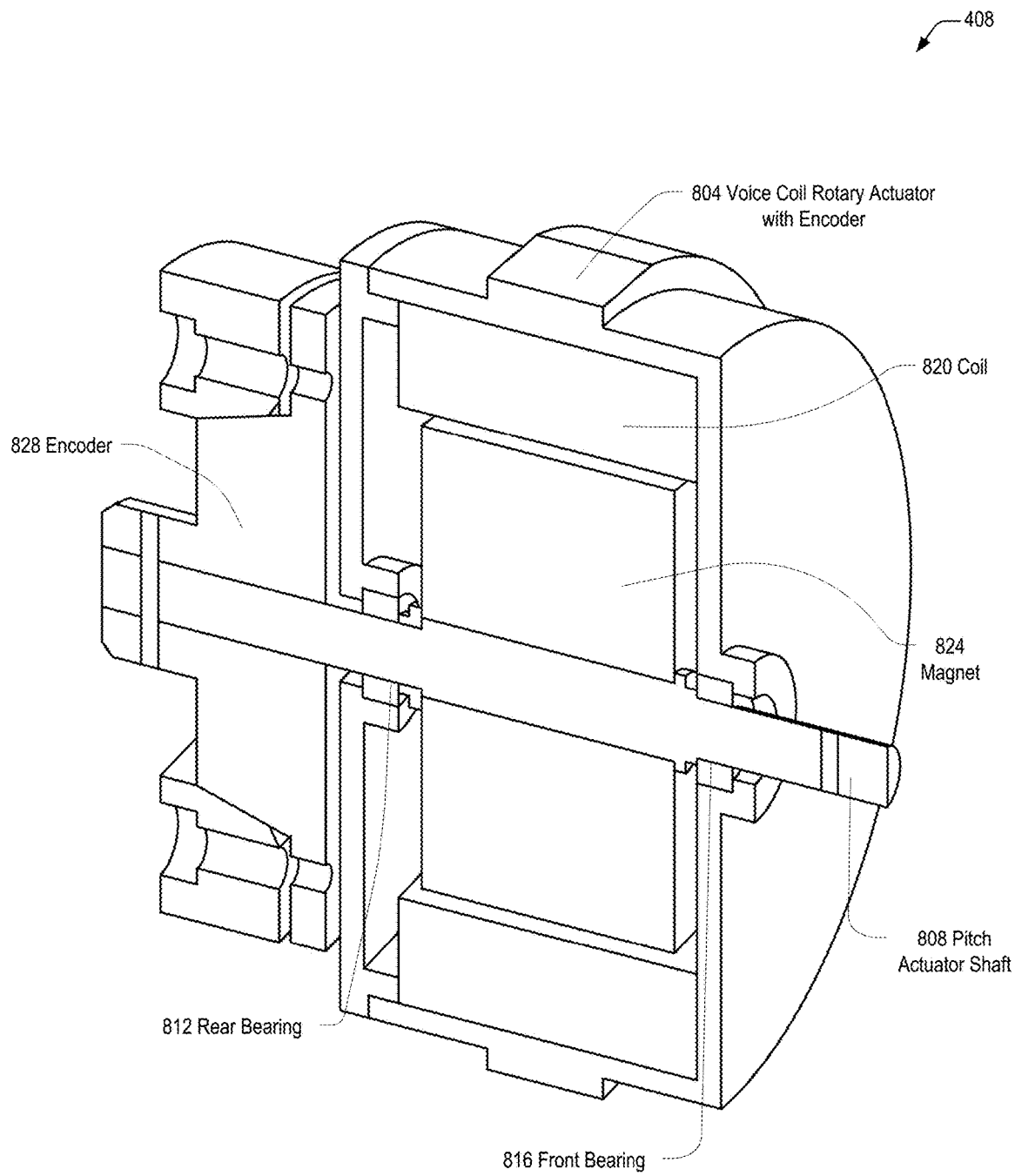

*Fig. 9 Heliogyro Axial Bearing Offload Device*
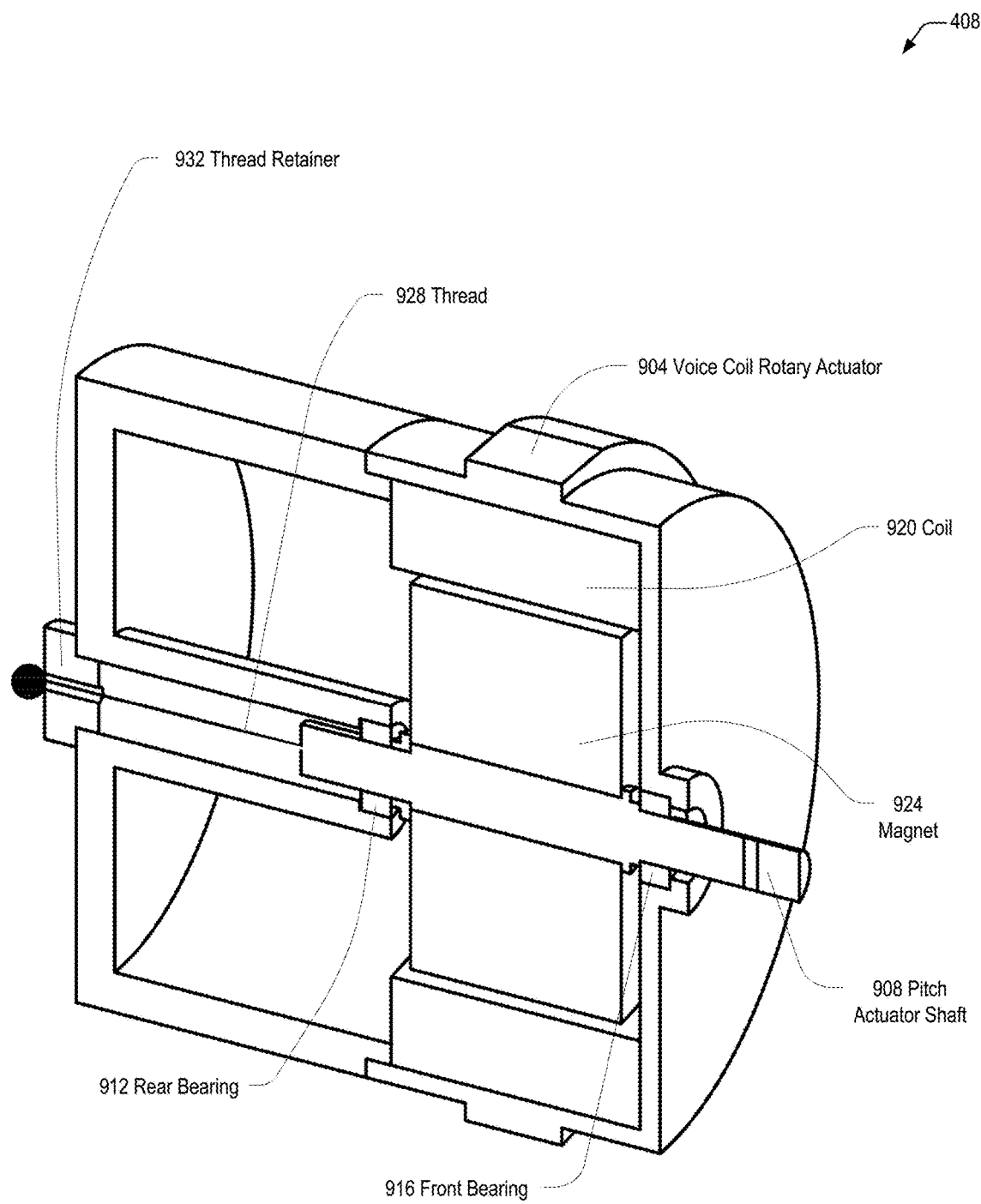

*Fig. 10 Heliogyro Deployed Blade Details*
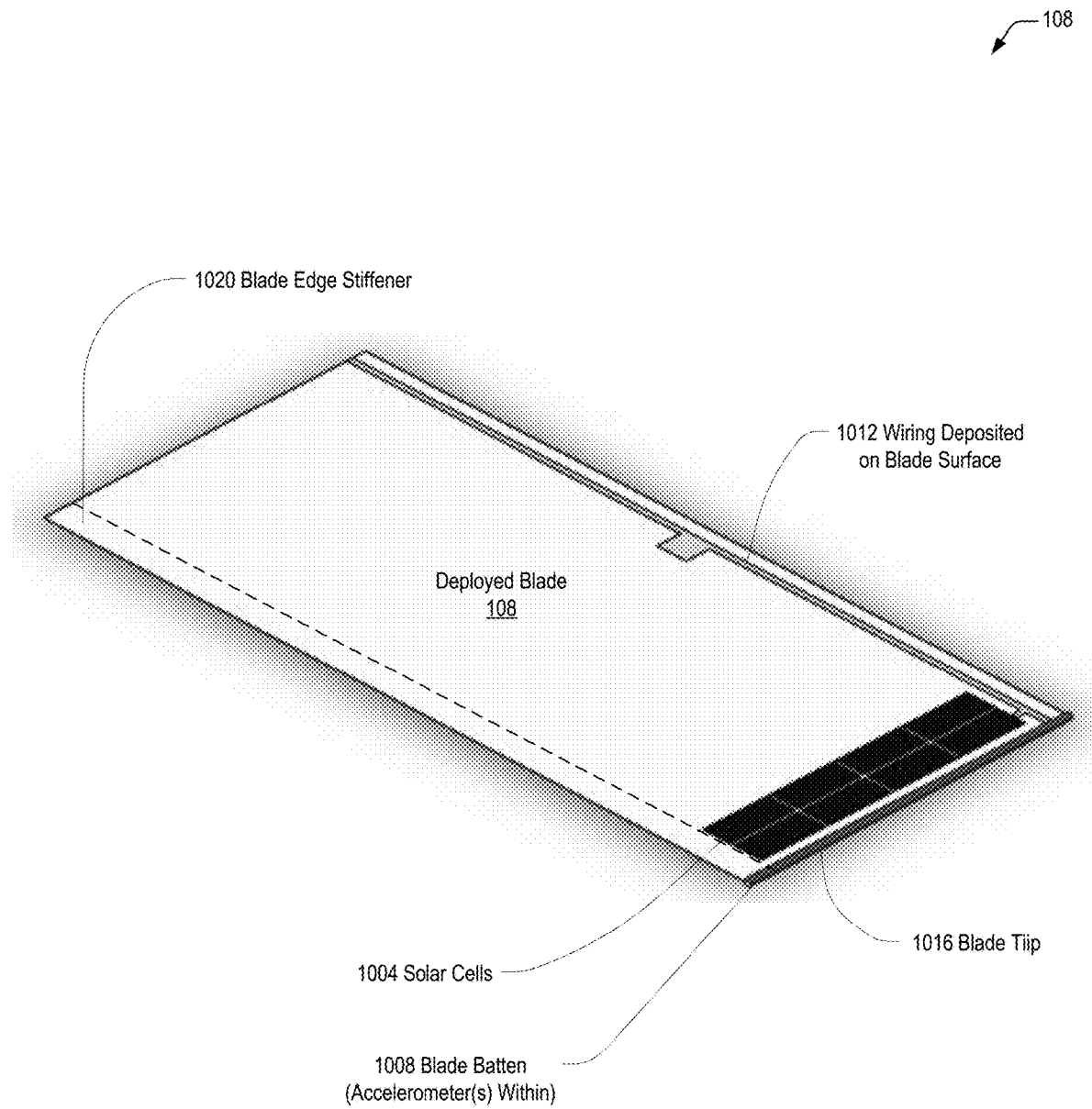

*Fig. 11 Heliogyro Blade Clamp Roller Actuation Steps*
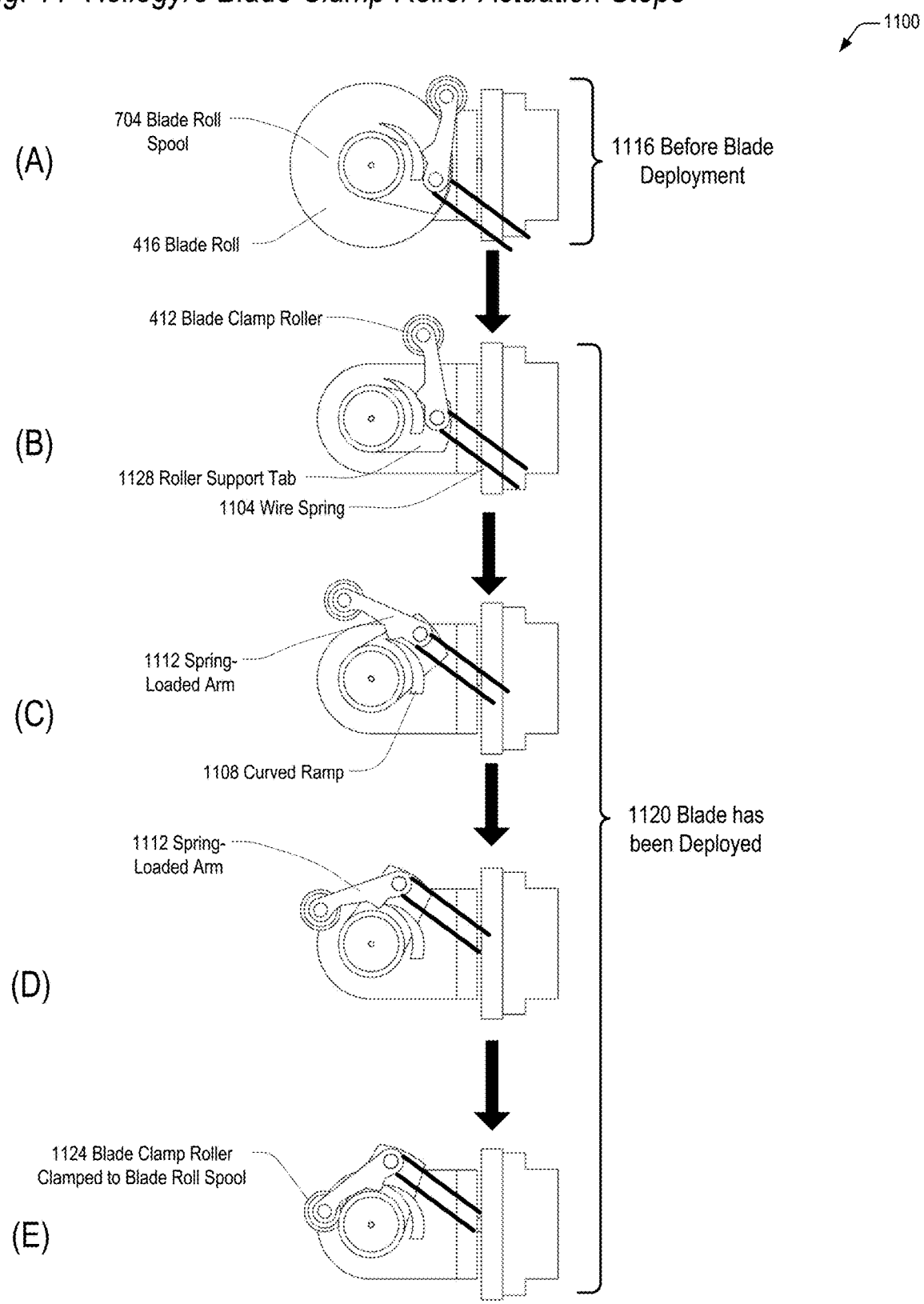

*Fig. 12 Heliogyro CubeSat Configurations*
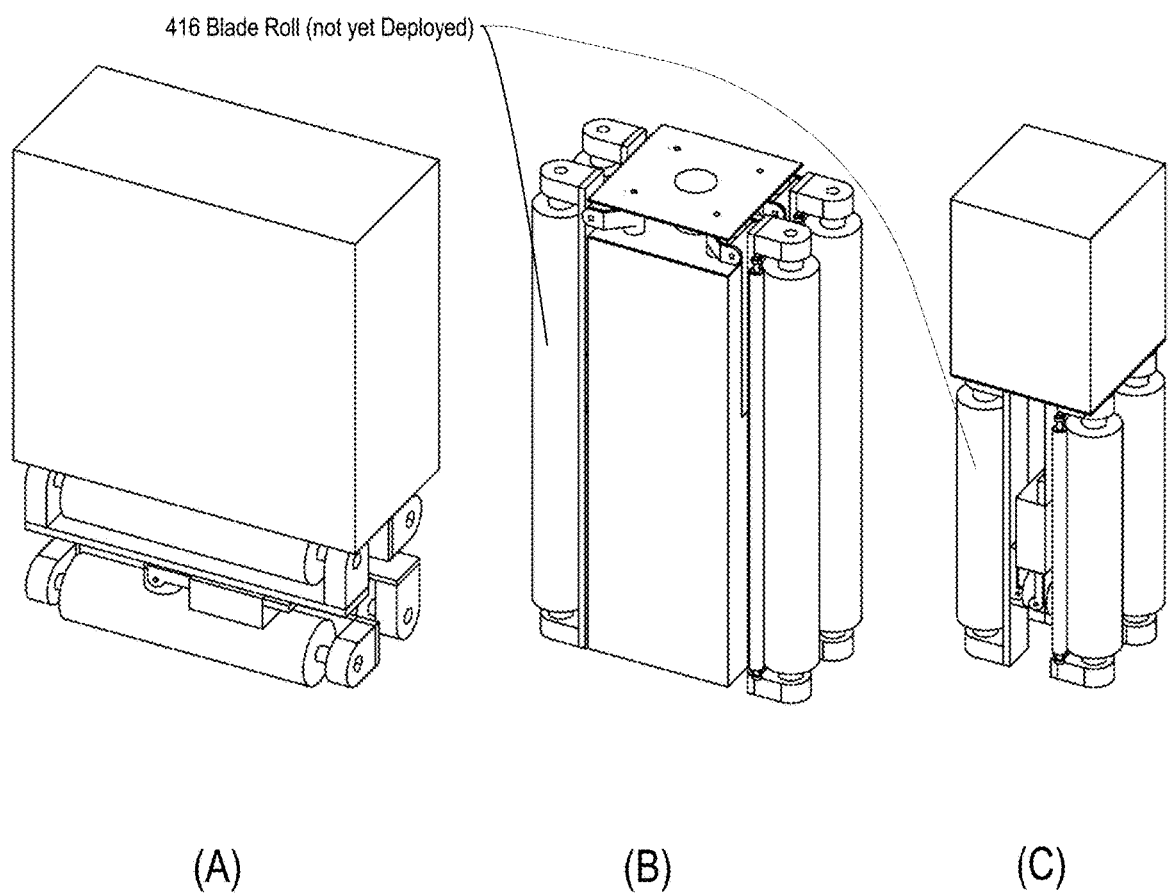
(A)         (B)         (C)

Fig. 13  Heliogyro After Ejecting from CubeSat Canister
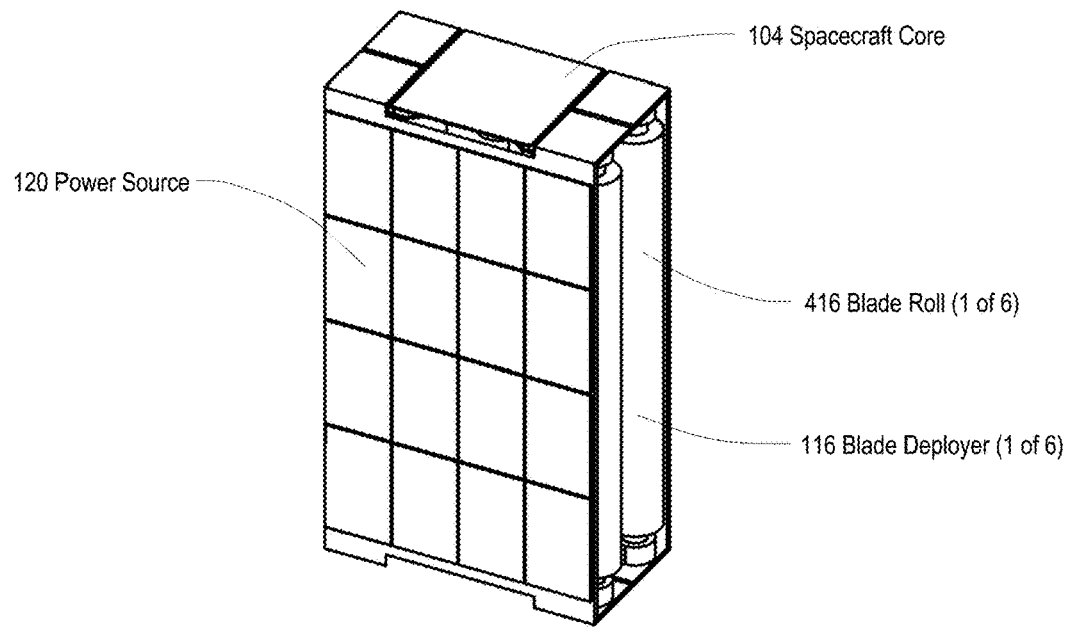
Fig. 14  Heliogyro After Deploying Solar Panels
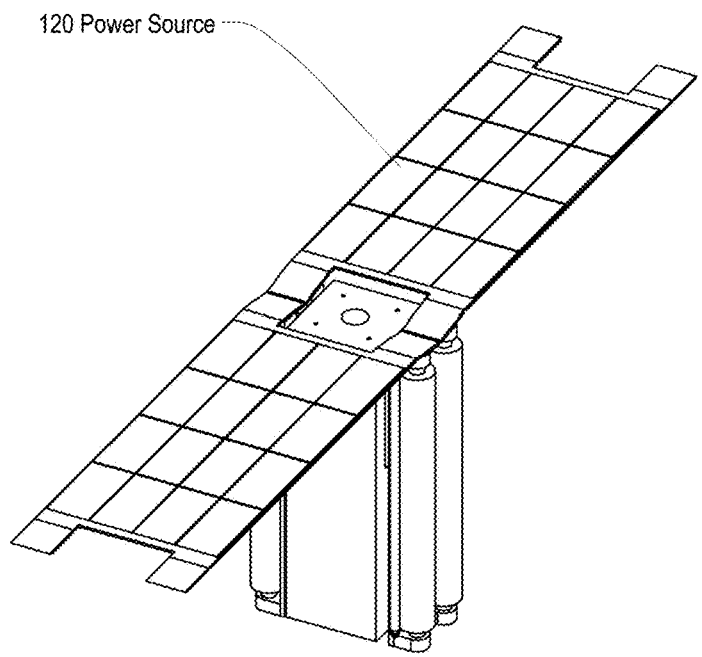

Fig. 15 Heliogyro Strut Deployment
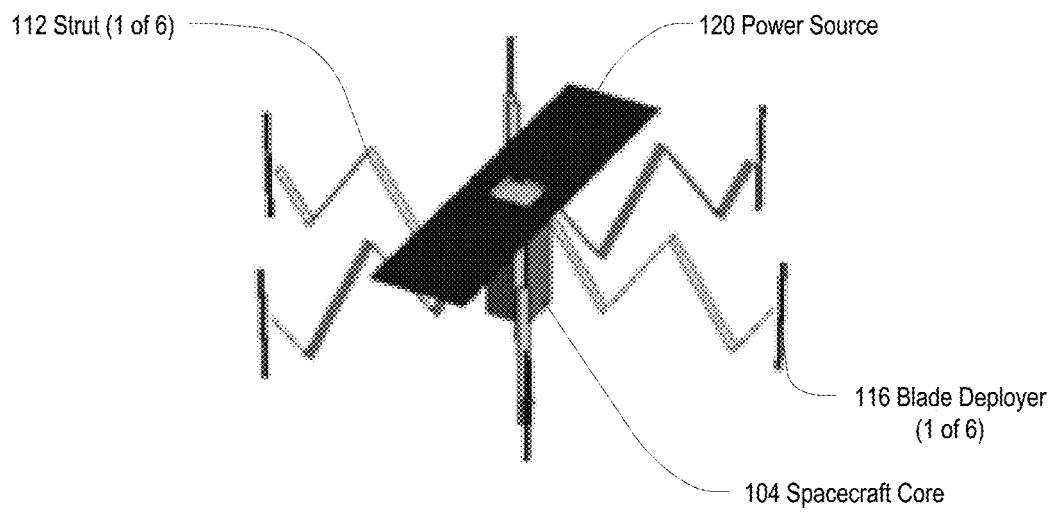
Fig. 16 Heliogyro After Fully Extending Struts
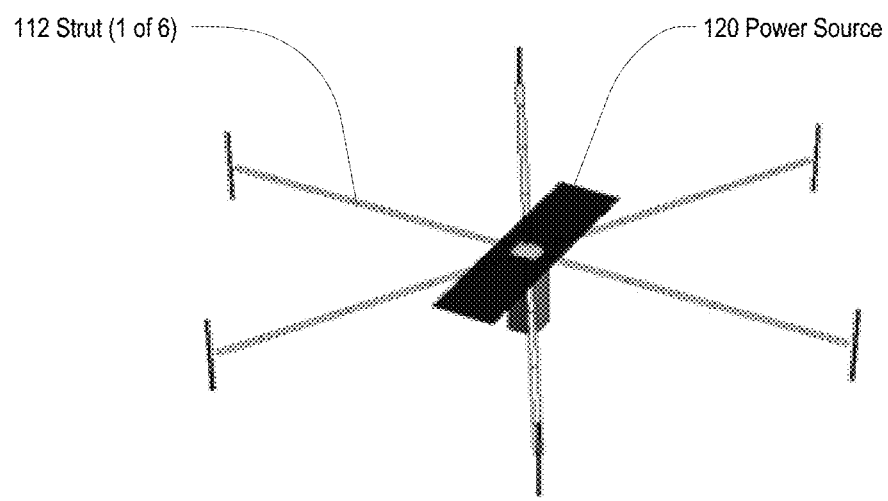

*Fig. 17 Heliogyro with Aligned Blade Deployers*
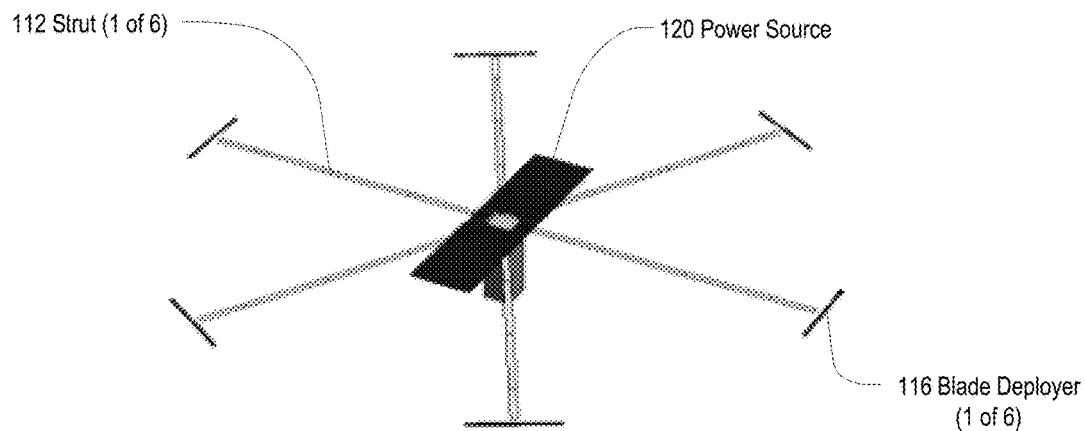
*Fig. 18 Heliogyro with Fully Deployed Blades*
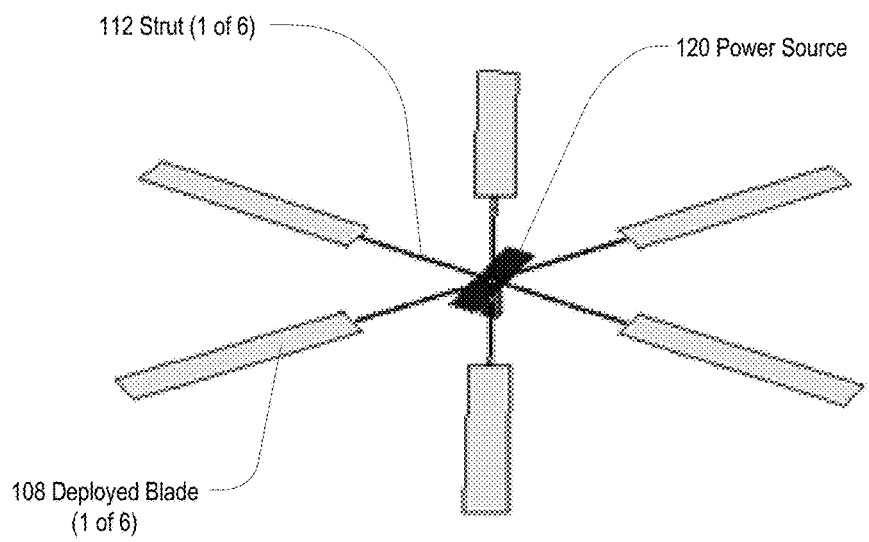

Fig. 19 Alternative Heliogyro Cubesat storage Arrangement
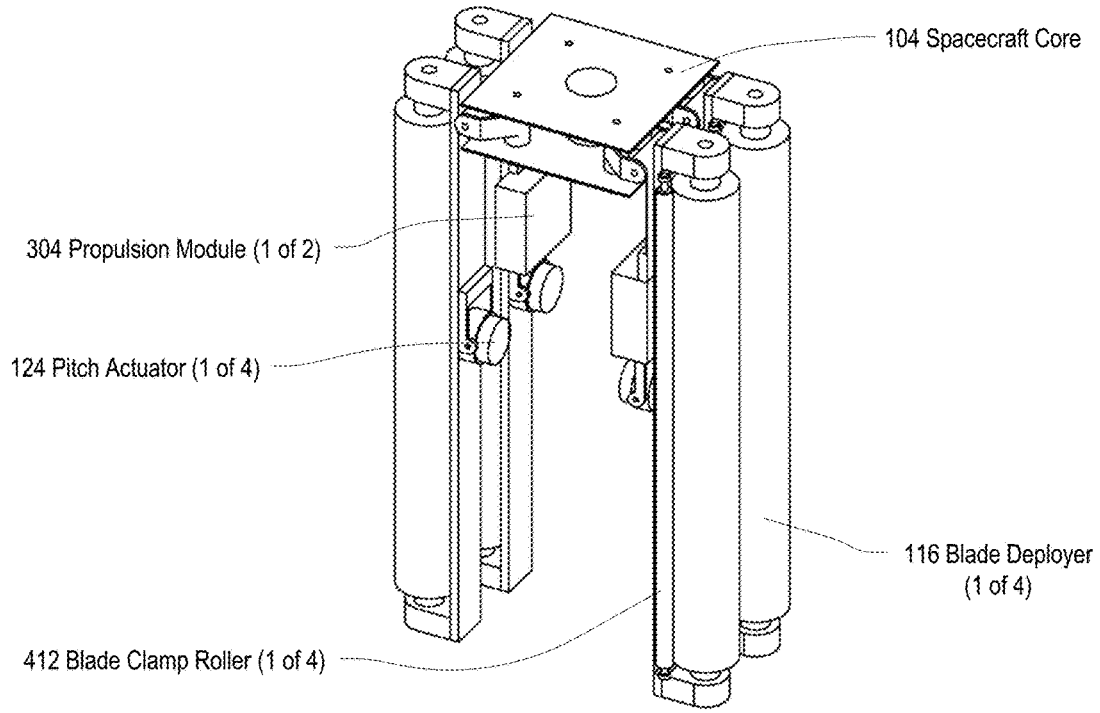
Fig. 20 Damper Locations for Alternative Heliogyro
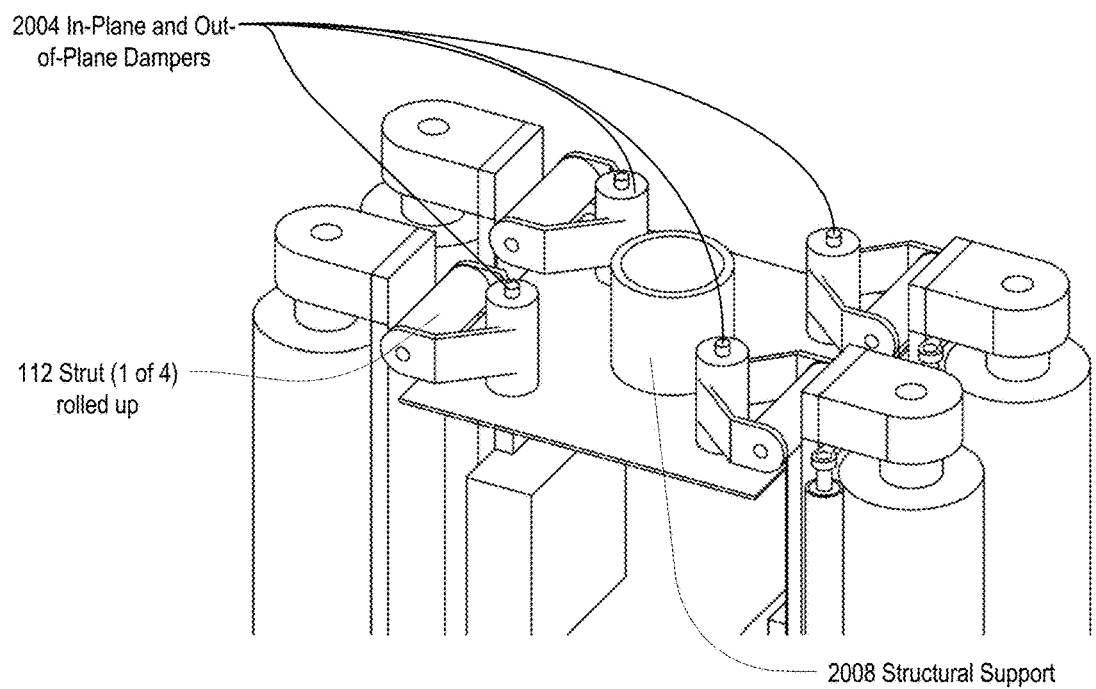

Fig. 21 Heliogyro Deployment Process
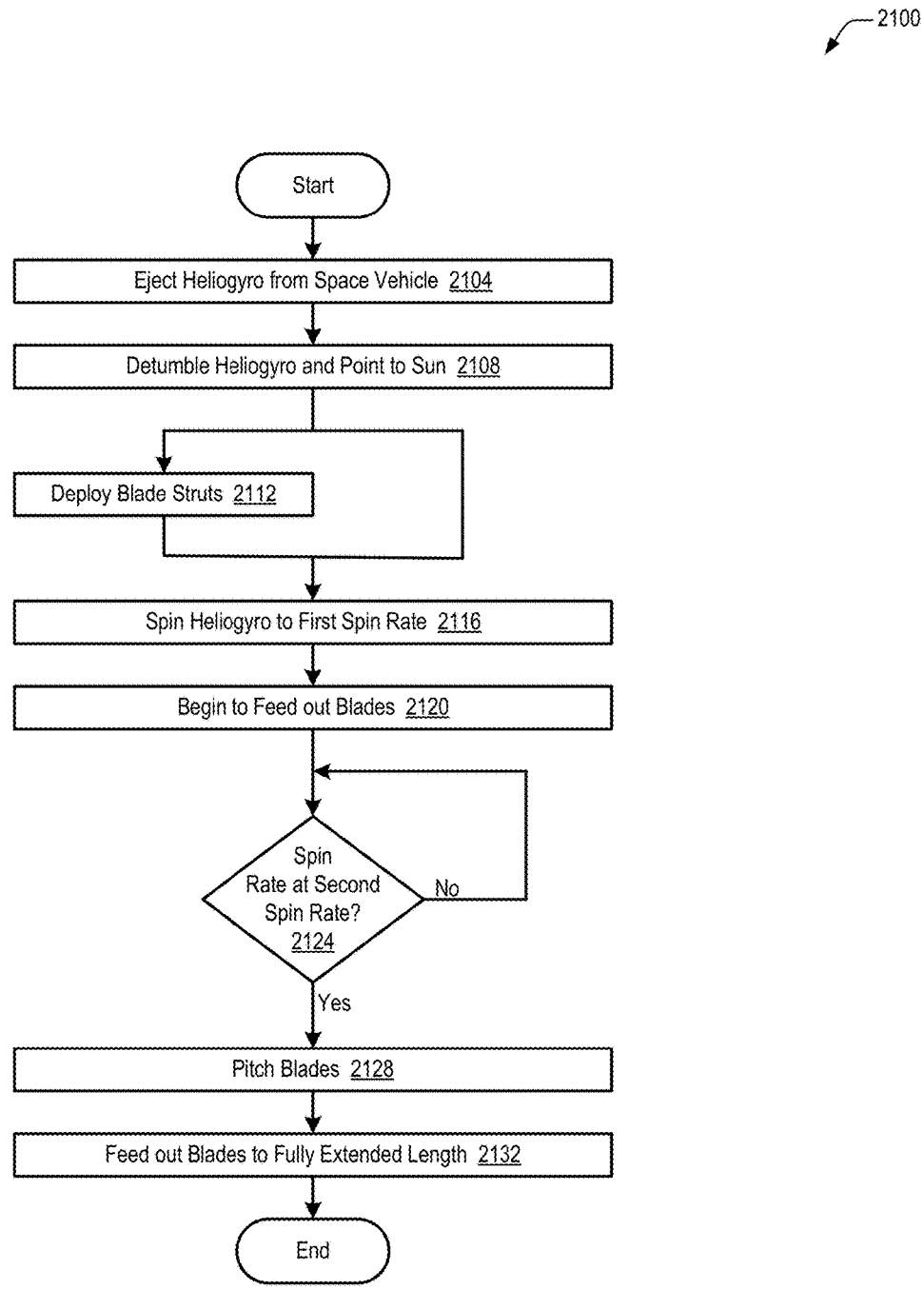

*Fig. 22A Heliogyro Cyclic Manuever*
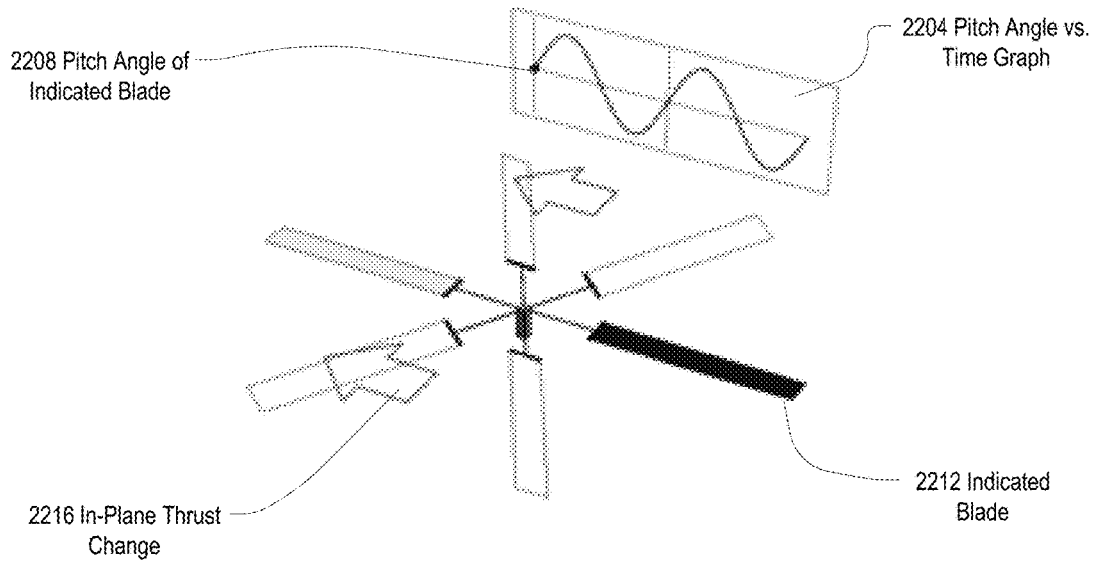
*Fig. 22B Heliogyro Collective-Cyclic Pitch Maneuver*
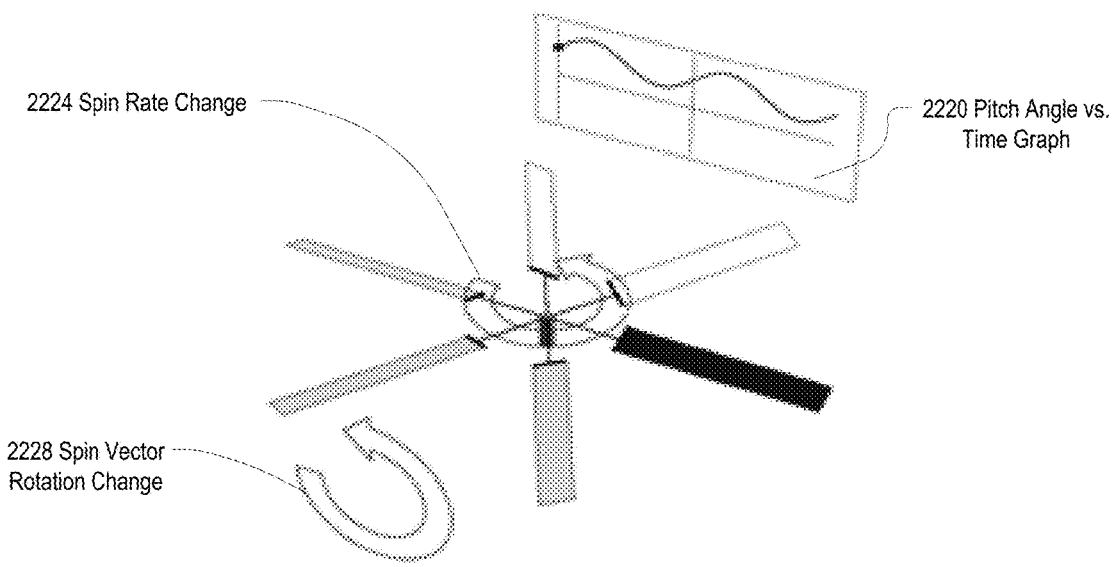

*Fig. 22C Heliogyro Collective Pitch Maneuver*
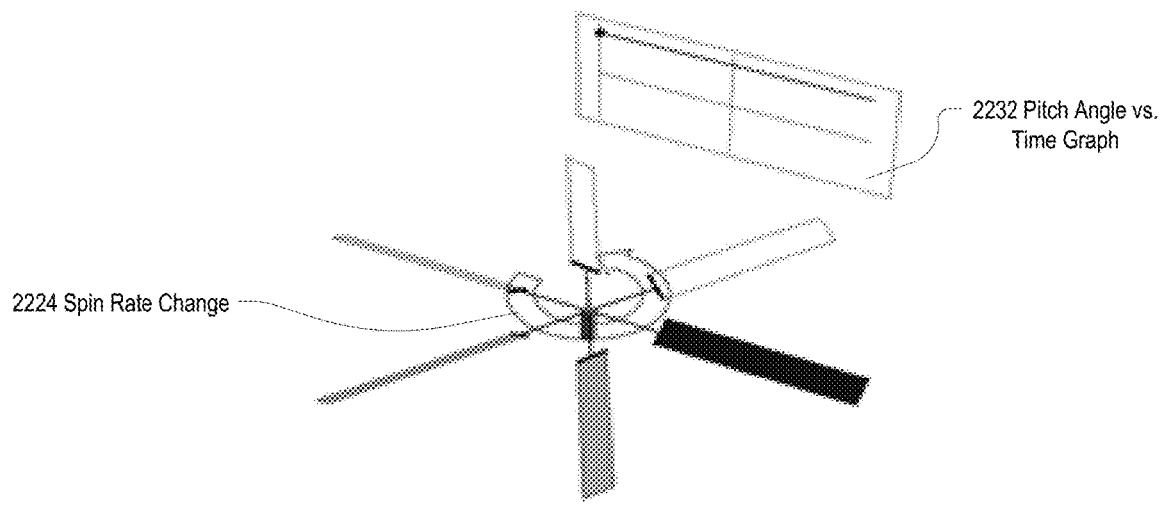
*Fig. 22D Heliogyro Half-P Pitch Maneuver*
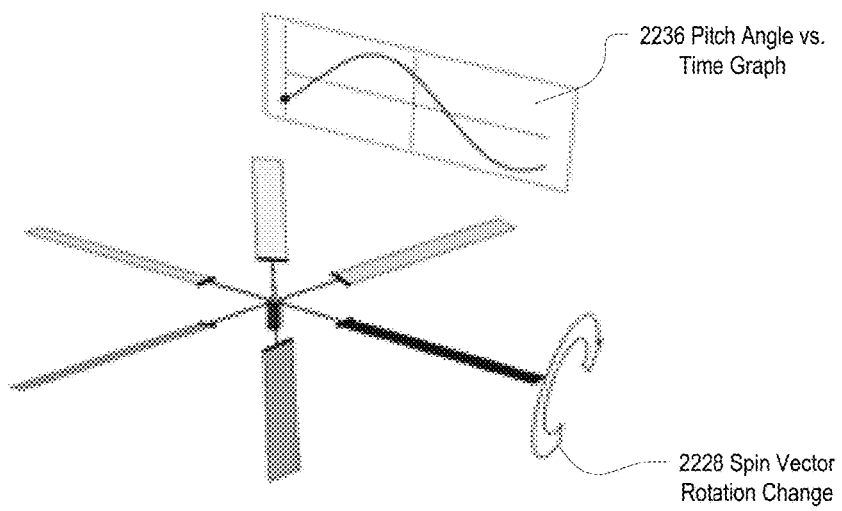

Fig. 23 Heliogyro Control Device Block Diagram
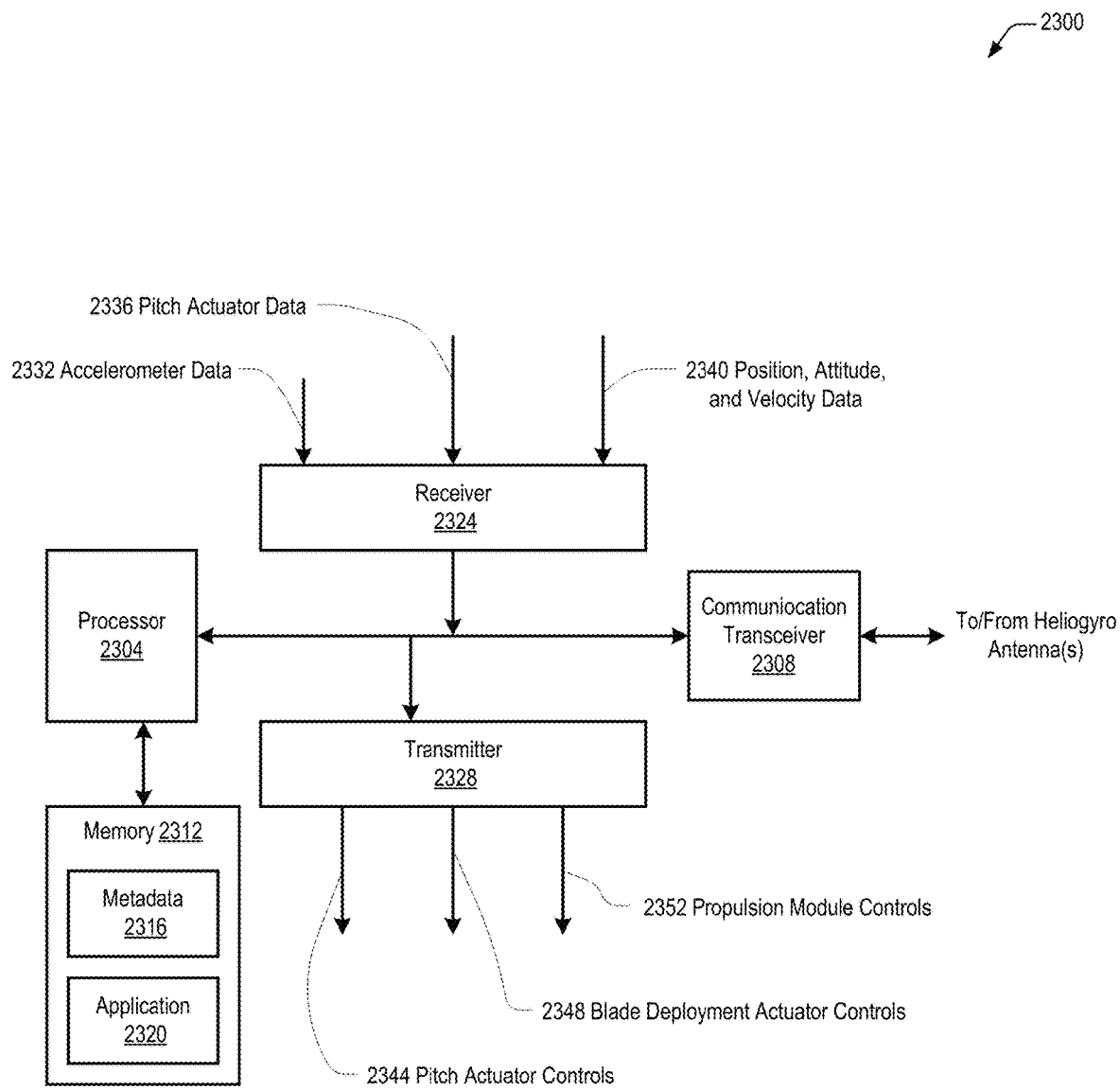

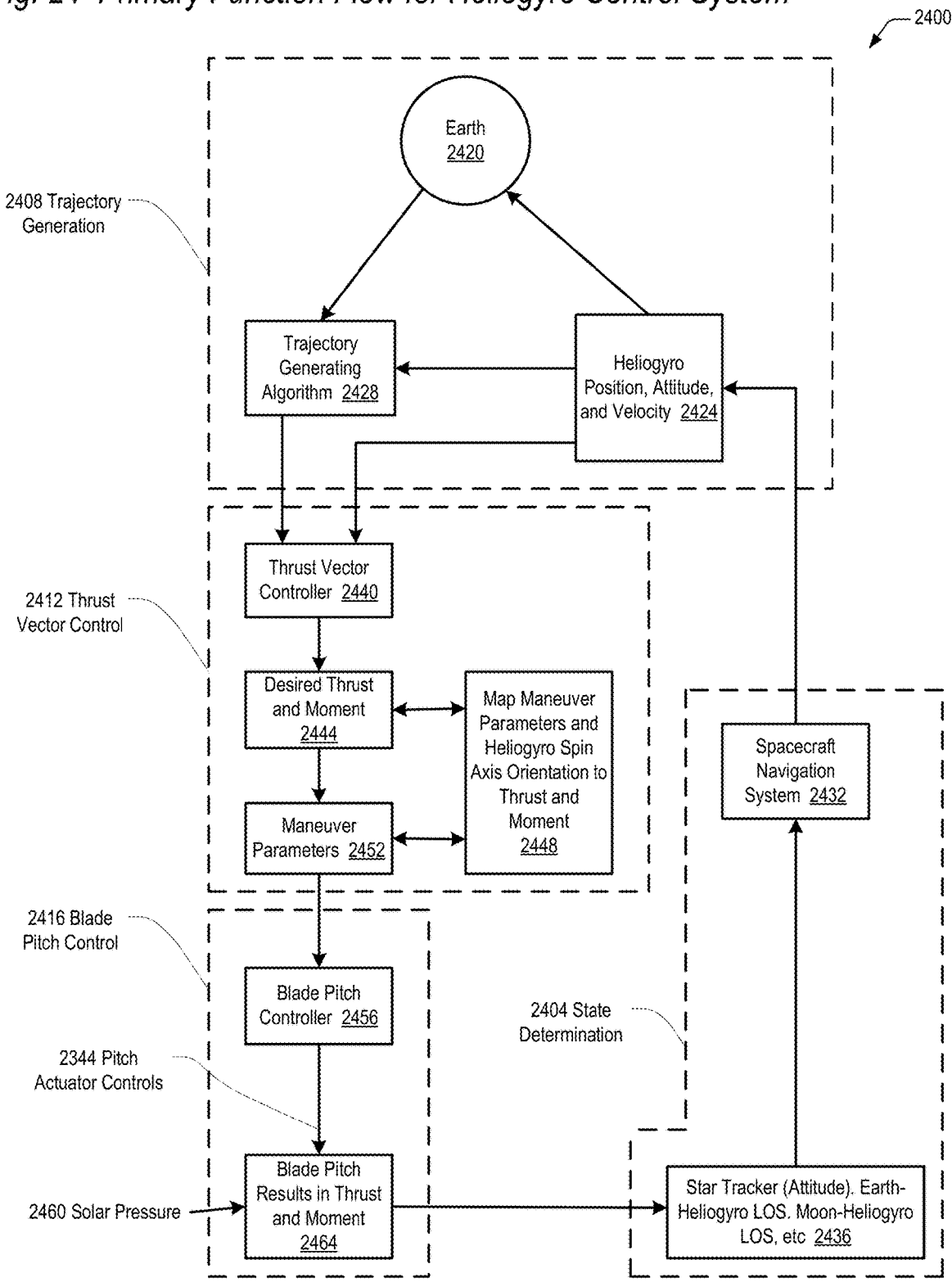
Fig. 24 Primary Function Flow for Heliogyro Control System

*Fig. 25 Heliogyro Control System Internal Model Controllers*
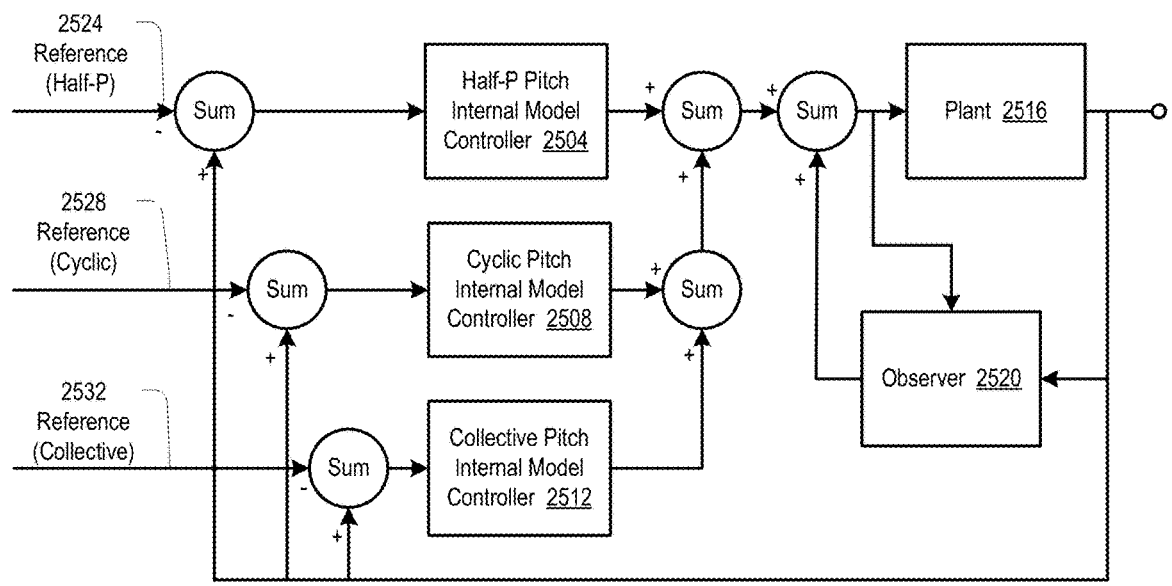

Fig. 26 Heliogyro Despin Mechanism Options
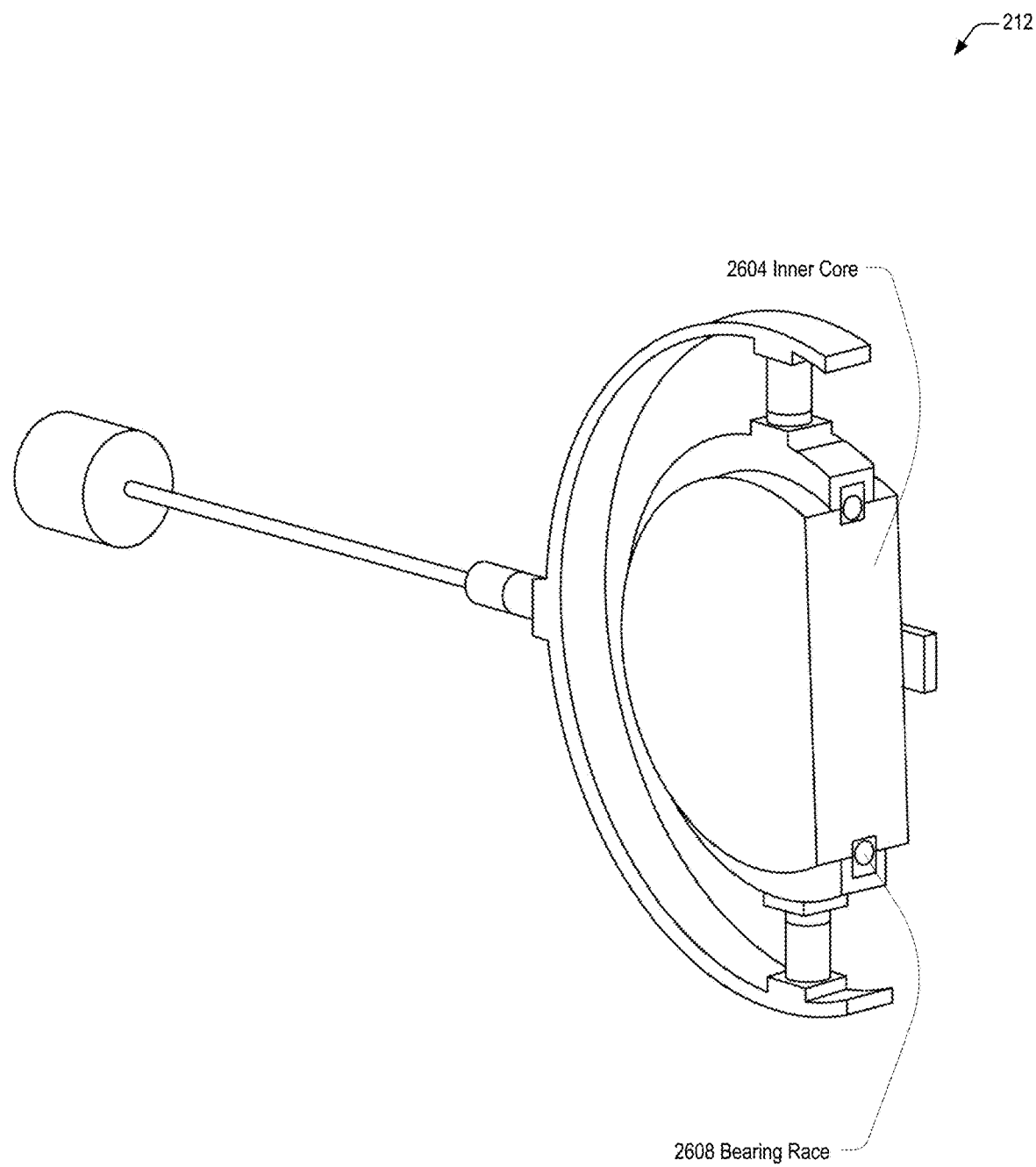

Fig. 27 Heliogyro Despin Mechanism Side View
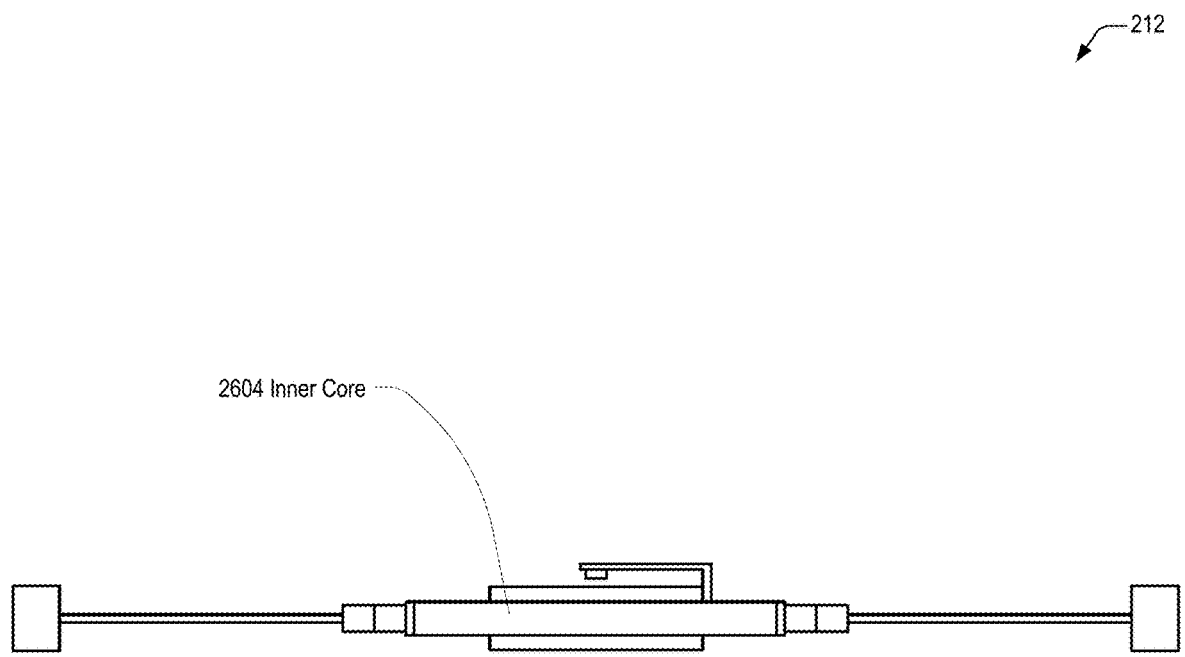

SPACECRAFT AND CONTROL METHOD

CROSS REFERENCE TO RELATED APPLICATIONS

This application is a Division of National Stage Application No. 16/309,149, filed Dec. 12, 2018, U.S. Pat. No. 11,338,942, under 35 U.S.C. § 371, of International Patent Application No. PCT/US17/37543, filed on Jun. 14, 2017, which claims priority to earlier filed Provisional Application No. 62/349,941 filed Jun. 14, 2016 and entitled "HELIO-GYRO DESIGN, OPERATION, AND APPLICATION", the entire contents of which are hereby incorporated by reference.

FIELD

The present invention is directed to apparatuses and control methods for spacecraft. In particular, the present invention is directed to apparatuses and methods for a Heliogyro and deployment/control thereof.

BACKGROUND

A spacecraft is a vehicle or machine designed to fly in space. Spacecraft are used for a variety of purposes, including communications, earth observation, meteorology, navigation, space colonization, planetary exploration, and transportation of humans and cargo. On a sub-orbital spaceflight, a spacecraft enters space and then returns to the Earth, without having gone into orbit. For orbital spaceflights, spacecraft enter closed orbits around the Earth or around other celestial bodies. Spacecraft used for human spaceflight carry people on board as crew or passengers from start or on orbit (space stations) only, whereas those used for robotic space missions operate either autonomously or telerobotically. Robotic spacecraft used to support scientific research may be space probes. Robotic spacecraft that remain in orbit around a planetary body may be artificial satellites. Some spacecraft, such as Pioneer 10 and 11, Voyager 1 and 2, and New Horizons, are on trajectories that leave the Earth's Solar System. Orbital spacecraft may be recoverable, or not. By method of reentry to Earth they may be divided in non-winged space capsules and winged spaceplanes.

Unmanned spacecraft are spacecraft without people on board, used for unmanned spaceflight. Unmanned spacecraft may have varying levels of autonomy from human input, they may be remote controlled, remote guided or even autonomous, meaning they have a pre-programmed list of operations, which they will execute, unless otherwise instructed by Earth-based guidance. Autonomous spacecraft may also have decision-making capabilities for determining the order of operations performed or the parameters governing operations. Many habitable spacecraft also have varying levels of robotic features. For example, the space stations Salyut 7 and Mir, and the ISS module Zarya were capable of unmanned remote-guided station keeping, and docking maneuvers with both resupply craft and new modules. The most common unmanned spacecraft categories are robotic spacecraft, unmanned resupply spacecraft, space probes, and space observatories. Not every unmanned spacecraft is a robotic spacecraft, for example a reflector ball is a non-robotic unmanned spacecraft.

SUMMARY

The present invention is directed to solving disadvantages of the prior art. In accordance with embodiments of the present invention, a method of controlling a spacecraft is provided. The method includes one or more of calculating, by a control device, spacecraft position, attitude, and velocity, the spacecraft including a plurality of blade actuators controlling pitch for a plurality of blades, the plurality of blades extending radially away from a spacecraft core and including material configured to be deflected by solar pressure, receiving mission plan updates for the spacecraft, calculating an updated trajectory based on the position, attitude, velocity, mission plan updates, and past spacecraft behavior, generating maneuver parameters for the spacecraft from the updated trajectory, creating new blade pitch profiles for a plurality of blade actuators, from the maneuver parameters, sending controls corresponding to the new blade pitch profiles to the plurality of blade actuators, and transitioning from current blade pitch profiles to the new blade pitch profiles.

One advantage of the present invention is that it provides a spacecraft with a high thrust-to-weight ratio. A large blade surface area provides a large cumulative solar pressure as the thrust source. Centripetal tension and chord-wise battens provide stiffness instead of booms, resulting in a lighter system.

Another advantage of the present invention is that it allows complete attitude control. A Heliogyro utilizes spun sails or blades to provide control similar to a helicopter. Collective and cyclic pitch of the blades adjusts the spin vector and controls the thrust vector.

Another advantage of the present invention is that it provides for compact storage of the spacecraft. Each blade individually rolls up on a spool for stowage, thereby packing into the most compact volume possible. This type of stowage facilitates deployment and avoids folding, which can impart permanent wrinkles into the sail or blade material. Additionally, unrolling a blade is inherently more reliable than unfolding and tensioning.

Another advantage of the present invention is it allows for the spacecraft to be un-deployed and moved to a different location without having to move itself. That is, the deployed blades may be rolled up onto the blade deployers, the struts may be rolled up or folded, solar panels may be folded, and the entire spacecraft may be packed into a compact storage space such as a CubeSat envelope for transport and re-deployment. This facilitates spacecraft re-use in space, perhaps eliminating a need to deploy a different spacecraft somewhere else.

Another advantage of the present invention is that it provides for excellent spacecraft scalability. Blade width, blade length and the number of blades provided by the Heliogyro can be scaled up. Dynamics are consistent throughout the practical trade space.

Another advantage of the present invention is that it provides for excellent ground testability. Blade assemblies mounted to a vertical spinning axis within a vacuum chamber allow for blade deployment and centripetally stiffened blade pitch tests to verify blade models and hardware. This results in the blade subsystem reaching a NASA Technology Readiness Level (TRL) of 6 without leaving Earth. TRL is a method of estimating technology maturity of Critical Technology Elements (CTE) of a program during the technology acquisition process. They are determined during a Technology Readiness Assessment (TRA) that examines program concepts, technology requirements, and demonstrated technology capabilities. TRL are based on a scale from 1 to 9 with 9 being the most mature technology. The use of TRLs enables consistent, uniform discussions of technical maturity across different types of technology.

Yet another advantage of the present invention is that it provides for redundancy and fault tolerance. Multiple blades allows for compensation in the case of an anomaly such as a mechanical or electrical failure of a blade or damage to a blade from an impact.

Additional features and advantages of embodiments of the present invention will become more readily apparent from the following description, particularly when taken together with the accompanying drawings. This overview is provided to introduce a selection of concepts in a simplified form that are further described below in the Detailed Description. It may be understood that this overview is not intended to identify key features or essential features of the claimed subject matter, nor is it intended to be used to limit the scope of the claimed subject matter.

BRIEF DESCRIPTION OF THE DRAWINGS

FIG. 1 is a diagram illustrating main components of a strut Heliogyro in accordance with embodiments of the present invention.

FIG. 2 is a block diagram illustrating main components of a ring Heliogyro in accordance with embodiments of the present invention.

FIG. 3 is a diagram illustrating Heliogyro spin using strut-mounted thrusters 300 in accordance with embodiments of the present invention.

FIG. 4 is a diagram illustrating Heliogyro blade deployer details in accordance with embodiments of the present invention.

FIG. 5 is a diagram illustrating a Heliogyro spring-loaded attachment point of view A-A in accordance with embodiments of the present invention.

FIG. 6 is a diagram illustrating a Heliogyro blade feedout system in accordance with embodiments of the present invention.

FIG. 7 is a diagram illustrating a Heliogyro blade feedout system in accordance with embodiments of the present invention.

FIG. 8 is a diagram illustrating a cross section of a Heliogyro blade actuator in accordance with embodiments of the present invention.

FIG. 9 is a diagram illustrating a cross section of a Heliogyro axial bearing offload device in accordance with embodiments of the present invention FIG. 10 is a diagram illustrating Heliogyro deployed blade details in accordance with embodiments of the present invention.

FIG. 11 is a diagram illustrating Heliogyro blade clamp roller actuation steps in accordance with embodiments of the present invention.

FIG. 12 is a diagram illustrating exemplary Heliogyro CubeSat configurations in accordance with embodiments of the present invention.

FIG. 13 is a diagram illustrating an exemplary Heliogyro CubeSat configuration after ejecting from a CubeSat canister in accordance with embodiments of the present invention.

FIG. 14 is a diagram illustrating an exemplary Heliogyro CubeSat configuration after deploying solar panels in accordance with embodiments of the present invention.

FIG. 15 is a diagram illustrating exemplary Heliogyro CubeSat strut deployment in accordance with embodiments of the present invention.

FIG. 16 is a diagram illustrating an exemplary Heliogyro CubeSat configuration after fully extending struts in accordance with embodiments of the present invention.

FIG. 17 is a diagram illustrating an exemplary Heliogyro CubeSat configuration with aligned blade deployers in accordance with embodiments of the present invention.

FIG. 18 is a diagram illustrating an exemplary Heliogyro CubeSat configuration with fully deployed blades in accordance with embodiments of the present invention.

FIG. 19 is a diagram illustrating an exemplary alternative Heliogyro CubeSat storage arrangement in accordance with embodiments of the present invention.

FIG. 20 is a diagram illustrating damper locations for an alternative Heliogyro configuration in accordance with embodiments of the present invention.

FIG. 21 is a flowchart illustrating a process for deploying a Heliogyro in accordance with embodiments of the present invention.

FIG. 22A is a diagram illustrating a Heliogyro Cyclic Pitch Maneuver in accordance with embodiments of the present invention.

FIG. 22B is a diagram illustrating a Heliogyro Collective-Cyclic Pitch Maneuver in accordance with embodiments of the present invention.

FIG. 22C is a diagram illustrating a Heliogyro Collective Pitch Maneuver in accordance with embodiments of the present invention.

FIG. 22D is a diagram illustrating a Heliogyro Half-P Pitch Maneuver in accordance with embodiments of the present invention.

FIG. 23 is a block diagram illustrating a Heliogyro Control device in accordance with embodiments of the present invention.

FIG. 24 is a block diagram illustrating primary function flow for a Heliogyro control system in accordance with embodiments of the present invention.

FIG. 25 is a block diagram illustrating Heliogyro control system model controllers in accordance with embodiments of the present invention.

FIG. 26 is a diagram illustrating Heliogyro despin mechanism options in accordance with embodiments of the present invention.

FIG. 27 is a diagram illustrating a side view of a Heliogyro despin mechanism in accordance with embodiments of the present invention.

DETAILED DESCRIPTION

Solar sails (also called light sails or photon sails) are a form of spacecraft propulsion using radiation pressure exerted by sunlight on large mirrors. A useful analogy may be a sailing boat; the light exerting a force on the mirrors is akin to a sail being blown by the wind. High-energy laser beams could be used as an alternative light source to exert much greater force than would be possible using sunlight, a concept known as beam sailing. Solar sail craft offer the possibility of low-cost operations combined with long operating lifetimes. Since they have few moving parts and use no propellant, they can potentially be used numerous times for back-to-back missions delivering payloads.

Solar sails use a phenomenon that has a proven, measured effect on spacecraft. Solar pressure affects all spacecraft, whether in interplanetary space or in orbit around a planet or small body. A typical spacecraft going to Mars, for example, may be displaced by thousands of kilometres by solar pressure over the course of its trajectory, so the effects must be accounted for in trajectory planning. Solar pressure may also affect the orientation or attitude of a spacecraft. The total force exerted on an 800 by 800 meter solar sail, for example, is about 5 newtons (1.1 lb-f) at Earth's distance from the sun. This makes it a low-thrust propulsion system similar in some ways to spacecraft propelled by electric engines, but dissimilar as well, as it uses no propellant. The force is exerted constantly as long as solar radiation strikes the sail blades. The collective effect of the constant force over time is great enough to be considered a viable manner of propelling a spacecraft.

A Heliogyro is a propulsion system that utilizes reflected solar pressure as its only means of propulsion and attitude control. The continuous force generated by photons striking the windmill-like sail is sufficient to boost the craft out of earth's gravity well, and eventually out of the solar system. Collective and cyclic pitch of sail blades vectors thrust and adjusts the spin axis as needed to provide complete control authority. Although the pressure from the sun is less than the pressure from a piece of paper on an open hand, its persistent push imparts an accumulated thrust greater than rocket propulsion can provide. A Heliogyro is capable of interplanetary operation without the use of propellant, extending a spacecraft's reach to places that are currently otherwise unattainable.

Referring now to FIG. 1, a diagram illustrating main components of a strut Heliogyro 100 in accordance with embodiments of the present invention is shown. A Heliogyro spacecraft may be configured in many different arrangements. In a first arrangement, a plurality of blades 108 extends radially outward from a central spacecraft core 104 or core, where the plurality of blades 108 are in a common plane and equally radially spaced from each other. The spacecraft core 104 includes one or more computing devices that deploy, un-deploy, and control actuated surfaces and operation of the Heliogyro 100. Spacecraft core 104 may also include power storage devices to store electrical power. In some embodiments, spacecraft core 104 may also include one or more payloads, which may include cameras, sensors, experiments, antenna, and so forth.

In some embodiments, the Heliogyro 100 may include one or more power sources 120. In one embodiment, power sources 120 include one or more solar panels. In a preferred embodiment, power sources 120 include one or more solar panels integrated into the blade 108 material. Power sources 120 may provide power to operate the Heliogyro 100 to charge storage devices of the spacecraft core 104, or for transfer to another spacecraft or entity on a planetary body.

In the embodiment illustrated, the Heliogyro 100 includes struts or strut members 112 extending radially outward from the spacecraft core 104. Struts 112 provide standoff for each of the blades from the spacecraft core 104 so that each blade 108 may be deployed independently from each of the other blades 108, without interference. Struts also provide an offset between the blade root and spacecraft core 104, which allows for blade damping out of the plane of the nominal core-strut rotation, via strut 112 bending or actuation with respect to the spacecraft core 104 and blade 108. In some embodiments, the struts 112 include pairs of struts 112 extending in opposite directions away from the spacecraft core 104. In some embodiments, the struts may be extendable structures including booms and Storable Tubular Extension Member (STEM) booms.

Each strut 112 terminates in a blade deployer 116, which includes pitch actuators 124 to deploy and un-deploy each blade 108 of the Heliogyro 100. In an un-deployed state, each blade 108 may be stored in a rolled configuration on blade deployers 116. In a deployed state, each blade 108 is unrolled and extends radially outward from each blade deployer 116. That is, when un-deployed, a blade 108 may be unrolled and fully extended as a deployed blade 108, and once deployed, a blade 108 may be rolled on a spindle or blade spool roll 704 of a blade deployer 116 into an un-deployed state. Details of blade deployers 116 are described in more detail with reference to FIGS. 4-7. Exemplary descriptions of each of the primary Heliogyro 100 elements are provided in the following paragraphs.

A Heliogyro 100 has the general appearance of a windmill and employs sail control akin to a helicopter. A number of solar reflecting blades 108 extend radially in the same plane and attach to a central bus via extendable struts 112. In some embodiments, material for blades 108 may convert solar energy into electrical energy and thereby serve as solar blades 108. In one embodiment applicable to a CubeSat mission size, each deployed blade 108 measures 152 meters long, is up to 0.28 meters wide, and is constructed from aluminized, flight qualified 3 μm Kapton polyimide film. During operation, centripetal tension and chord-wise battens provide stiffness to the deployed blades 108. A Heliogyro control system 2400 uses collective and cyclic pitch of the deployed blades 108 to control attitude and thrust, and an onboard supervised autonomous Guidance, Navigation, and Control (GNC) system to generate short-term trajectory-following command sequences. In some embodiments, voice coil actuators 408 pitch and actively dampen the deployed blade 108 from the root. In one embodiment applicable to a CubeSat mission size, the Heliogyro 100 propulsion system weighs approximately 2.5 kilograms. When fully deployed, characteristic thrust, or the thrust achieved by the Heliogyro 100 with its sails/blades normal to the Sun at 1 Astronomical Unit (AU), is 0.12 milliNewtons (mN).

Referring now to FIG. 2, a block diagram illustrating main components of a ring Heliogyro 200 in accordance with embodiments of the present invention is shown. A ring Heliogyro 200 includes similar blades 108, pitch actuators 124, and blade deployers 116 shown and described with reference to the strut Heliogyro 100 of FIG. 1. In a ring Heliogyro 200, the spacecraft core 204 is constructed from a ring of segments connected by joints 208 in a ring arrangement, where each segment is mated to other segments at each end by joints 208. The joints 208 may be either flexible joints or a set of joints (i.e. revolute, spherical, universal, etc). The joints 208 may include in some embodiments active damping to reduce in-plane and/or out-of-plane vibration, and incorporate shape changing to reduce modal disturbances to reduce or dampen unwanted vibrations of the spacecraft core 104, 204.

In some embodiments, the spacecraft core 204 is joined to blades 108 with struts 112. In other embodiments, the segments of the spacecraft core 204 may include pitch actuators 124 and blade deployers 116, such that struts 112 may not be present.

In some embodiments, an actuated despin mechanism 212 may be included within the spacecraft core 204 structure, such as joined to opposite segments. The despin mechanism 212 may include an inner core, with inner gimbal actuation configured like a voice coil actuator of blade actuator 408. The despin mechanism 212 may include a race or two of bearings residing between an inner core and an inner gimbal. Each axis may include common slip rings. In the preferred embodiment, the despin mechanism 212 is gimbaled. In other embodiments, the despin mechanism 212 is non-gimbaled and generally spins in just one direction. In some embodiments, the spacecraft core 204 wirelessly transmits power and control data to the inner gimbal to control the actuated despin mechanism 212 and to communicate back and forth between the core and avionics or payloads on the despun section.

Referring now to FIG. 3, a diagram illustrating Heliogyro spin using strut-mounted thrusters 300 in accordance with embodiments of the present invention is shown. Heliogyro 100, 200 may include small thrusters as part of propulsion modules 304. Although one propulsion module 304 may be able to spin up the the Heliogyro 100, 200 to a preferred spin rate, it may be more efficient to use a pair of propulsion modules 304A and 304B located 180 degrees apart either on opposite struts 112 or opposite blade deployers 116 located on opposite sides of the spacecraft core 104, 204. For example, of a six blade Heliogyro 100, 200, spin up propulsion modules 304 should preferably be placed on blades extending in opposite directions.

In the embodiment illustrated in FIG. 3, propulsion modules 304 are located in proximity to the outer ends of struts 112. In the embodiment illustrated in FIG. 4, propulsion modules 304 are located in proximity to the blade deployers 116. By positioning the propulsion modules 304 in proximity to the ends of the struts 112 or the blade deployers 116, thrust from the propulsion modules 304 will have a greater moment around the spacecraft core 104, and allow smaller thrusters to be used then if placed closer to the spacecraft core 104, 204 itself. In the preferred embodiment, each propulsion module 304 has a set of thrusters pointed in different directions (not shown for clarity) that, when turned on singly, in pairs, or in some other pattern, can supply a net thrust in a range of directions in order to detumble the Heliogyro 100, 200 and orient it toward the sun.

Propulsion modules 304 provide a limited amount of thrust in a thrust direction 308 to facilitate rotation of the Heliogyro 100, 200 around the spacecraft core 104, 204. Although FIG. 3 illustrates a Heliogyro 100, 200 rotating in a counterclockwise direction, it should be understood that the propulsion modules 304 may be configured in order to spin the Heliogyro 100, 200 clockwise instead. In the preferred embodiment, spin-up of the Heliogyro 100 200 is performed prior to the blades being deployed 316. Spin-up prior to blades 108 being deployed supplies the necessary outward force, due to centripetal force, to pull the blades 108 radially outward as each blade 108 is unrolled. The initial spin rate provides sufficient pull for a significant portion of the blade deployment. Once spun-up, the Heliogyro 100, 200 spins in a spin direction 312 within the plane of the Heliogyro 100, 200.

As an alternative to propulsion modules 304, a rocket upper stage may have a spinning apparatus that pre-spins a Heliogyro 100, 200 as it is deployed. As another alternative, reaction wheels or magnetic apparatuses may be used in lieu of thrusters. In addition to providing an initial spin-up of the Heliogyro 100, 200, a propulsion module 304 can orient the Heliogyro 100, 200 normal to the sun, where it can be efficiently utilized once fully deployed.

Referring now to FIG. 4, a diagram illustrating Heliogyro blade deployer 116 details in accordance with embodiments of the present invention is shown. Heliogyro blade deployers 116 provide storage for un-deployed blades 108 in rolled form and control apparatuses to deploy and un-deploy each of the blades 108. A blade roll 416 stores the entire length of the blade 108 when the blade 108 is not deployed. The blade roll 416 provides the most efficient form for storage of an un-deployed blade 108 compared to folding or articulating a long and thin structure such as a blade 108. The blade roll 416 is retained between a pair of end caps 420. The end caps 420 capture each end of a spindle or blade roll spool 704 about which the blade roll 416 is stored. The end caps 420 are joined by a rigid structure extending across the width of the blade roll 416, which is generally joined to the pitch actuator 124, which attaches to the end of a strut 112 for strut Heliogyros 100 or ring Heliogyros 200 using struts 112. Each blade deployer 116 may also include a propulsion module 304, as previously discussed with respect to FIG. 3. View A-A is provided in FIG. 5 to show additional detail of the pitch actuator 124 mounting.

Pitch for each of the blades 108 is controlled by a pitch actuator 124 coupled to the widthwise support structure of the blade deployer 116. In the preferred embodiment, the pitch actuator 124 is a Lorentz Coil, which is a wire coil around a magnet—similar to a brushed motor without commutation. An audio voice coil motor is an example of this, which is preferred for less friction and higher lifetime (many millions of cycles). In less-desirable actuators such as motors utilizing brushes or ball bearings, brushes and ball bearings wear too fast. Also, piezoelectric transducers may be used, but this disadvantageously requires more power than Lorentz coil devices. Another advantage to using Lorentz coil actuators in conjunction with the blade deployers 116 is they may provide resistance or electromagnetic force as feedback that tells the control system how the blade 108 is performing.

In order to control the orderly deploying and un-deploying of the blade 108 material, a blade clamp roller 412 or similar structure is provided on the blade deployer 116. In one embodiment, a blade clamp roller 412 is always in contact with the blade roll 416, and exerts constant pressure to the blade roll 416 under spring force (not shown). In another embodiment, the blade clamp roller 412 has an associated blade clamp roller actuator (not shown) that may either clamp to the blade roll 416 or un-clamp and not be in contact with the blade roll 416. This actuated embodiment may be preferable by allowing the blade roll 416 to deploy the blade 108 under centripetal force when the blade clamp roller 412 is unclamped, as the Heliogyro 100, 200 is rotating or turning. At any point during the blade 108 deployment, the blade clamp roller 412 may be actuated to engage the blade roll 416 and limit or prevent further deployment of the blade 108. One alternative to the blade clamp roller 412 is a blade clamp bar (not shown), which positively clamps the deployed blade 108 to the blade roll 416 to fix the blade 108 at a current length of deployment from the blade deployer 116.

Referring now to FIG. 5, a diagram illustrating a Heliogyro spring-loaded attachment point of view A-A in accordance with embodiments of the present invention is shown. FIG. 5 illustrates a rear view of a blade deployer 116, from the view perspective of the spacecraft core 104, 204. The blade deployer 116 includes a blade assembly yoke 512, which spans the width of the blade deployer 116 and provides structure to support the blade roll 416 and blade clamp roller 412. In the preferred embodiment, each blade deployer 116 includes a pitch actuator 124 to rotationally clockwise or counterclockwise pitch 520 a deployed blade 108 relative to a pitch actuator 124. Also shown in FIG. 5 is a cross-section of the pitch actuator yoke 504.

It is important to be able to actively or passively damp any unwanted frequencies and motion in all three axes. When the spacecraft 104, 204 is operating, the in-plane motion (i.e. within the spin plane) and the out-of-plane motion (i.e. perpendicular to the spin plane) need to be damped. An in-plane damping system may be provided in the illustrated direction 508 where the strut 112 meets the blade deployer 116, for example using a sliding spring-loaded attachment point 516 as shown that moves horizontally within an attachment point slot 524. Alternatively, various motors or actuators could be used to provide in-plane damping. The spring-loaded attachment point 516 allows for two things: first, it allows the blade deployer 116 to shift sideways to aid in fitting inside a CubeSat or other stowage envelope; second, it can be embodied as a spring-damper, and can thus dampen out in-plane blade vibration modes 508.

Referring now to FIG. 6, a diagram illustrating a blade deployer 116 feedout system in accordance with embodiments of the present invention is shown. The blade deployer 116 includes a blade roll 416 and a blade clamp roller 412, and attaches to a distal end of a strut 112. The strut 112 is a rigid structure providing standoff 604 from the spacecraft core 104, 204 to the blade deployer 116. Struts 112 provide an improvement over conventional Heliogyro proposals that utilize combinations of poles and wires that extend from the blade assembly yoke 512 outward to a location along the blade length to add rigidity and dampen out-of-plane movement. Struts 112 may in some embodiments advantageously require less storage area than poles/wires, and snags during blade 108 deployment are less likely. In the preferred embodiment, the strut 112 is between 1% to 3% of the length of the deployed blade 108. Therefore, for a deployed blade 108 1000 meters in length, the strut 112 would normally be expected to be between 10 meters to 30 meters in length.

The strut 112 may be a STEM boom or an unrolled section of rigidizable material that is stored in a compact fashion such as a roll when in an un-deployed state. In some embodiments, a blade hinge is offset from the core to dampen both in-plane and out-of-plane vibrations. The blade hinge is the point on the blade roll 416 where the deployed blade 108 departs. The blade 108 is so thin that the departure point acts like a hinge. The blade 108 can easily bend up and down at that point. The distance between the blade hinge and the strut attachment point on the spacecraft core 104, 204 is the blade hinge offset 604, or in other words, the offset distance from the spacecraft core 104, 204.

The strut 112 replaces other structures of the conventional art involving various forms of wires to provide stiffness and out-of-plane damping. Either in-plane and/or out-of-plane dampers may be located at the root of each strut 112, where it attaches to the spacecraft core 104, 204.

Referring now to FIG. 7, a diagram illustrating a Heliogyro blade feed out system in accordance with embodiments of the present invention is shown. FIG. 7 illustrates a blade deployer 116 without the blade 108 or blade roll 416 shown, in order to represent the supporting components more clearly. The blade roll 416 is stored on a blade roll spool 704 or spindle, which allows the blade roll 416 to be stored in the most efficient space possible. Rotation of the blade roll spool 704 is controlled by a blade deployment actuator 708 within one or both end caps 420 or the blade roll spool 704. The blade deployment actuator 708 provides a lightweight and compact arrangement to unroll the blade 108 at a carefully controlled rate. In some embodiments, the blade deployment actuator 708 is within the blade roll spool 704 and drives the spool via an engagement feature, half of which resides on the actuator shaft and the other half is attached to the blade roll spool 704.

The blade deployment actuator 708 may be any form of suitable radial actuator including a DC motor, a stepper motor, or similar. One alternative to a blade deployment actuator 708 is to provide a mass at the end of each blade 108, which will auto-deploy the blade 108 under centripetal or Coriolis force when the blade 108 is spinning. In one embodiment, the blade deployer 116 may know when the blade 108 is fully deployed or half deployed or at any other position is by providing an optical code such as a barcode or other known optical code on the blade 108 material itself, and a corresponding optical sensor within the blade deployer 116 apparatus. When an appropriate portion of blade 108 material passes under the optical sensor, the optical code will be detected by the sensor, which may then adjust the blade clamp roller 412 or the blade deployment actuator 708, as needed. As an alternative, an encoder or other form of potentiometer in proximity to blade deployment actuator 708 or blade roll spool 704 may be used instead.

Referring now to FIG. 8, a diagram illustrating a Heliogyro pitch actuator 408 in accordance with embodiments of the present invention is shown. A pitch actuator 124 is located at the root of a blade 108 (i,e, where a blade deployer 116 is attached to a strut 112), at the center of a blade deployer 116. In the preferred embodiment, blade pitch damping is provided by a voice coil rotary actuator or Lorenz coil with an encoder 804.

Voice coil actuators, or Lorentz coils, advantageously provide rapid response, low friction, and high reliability. The pitch actuator 124 provides blade pitch and active torsional damping. Since no gearing is required by a voice coil actuator, the inherently low friction allows mechanical feedback from the blade 108 to the pitch actuator 124.

Each Heliogyro pitch actuator 124 includes a pitch actuator shaft 808 which rotates about a central axis through the pitch actuator 124 device. In the voice coil configuration, pitch actuator control signals 2344 energize a coil 820 and magnet 824 coupled to the pitch actuator shaft 808 in order to rotate the shaft 808 a predetermined amount in either direction. The pitch actuator 124 includes a rear bearing 812 and a front bearing 816, which are preferably very low friction bearings. Pitch actuator 124 may also include an encoder 828 to provide feedback as to a rotary position of the pitch actuator shaft 808.

Referring now to FIG. 9, a diagram illustrating a Heliogyro axial bearing offload device in accordance with embodiments of the present invention is shown. As previously described, the pitch actuator 124 may be a Lorentz coil or similar type of voice coil device, and may include an encoder 828 or other type of rotary position sensor. FIG. 9 illustrates a special case of the pitch actuator 124 shown and described with reference to FIG. 8.

In order to minimize axial forces on the front bearing 916 and rear bearing 912, a retainer 932 and thread 928 provide inward radial force opposite to outward centripetal force applied to the pitch actuator shaft 908. The thread 928 provides a small amount of axial force to the shaft of the actuator in order to minimize friction between the shaft 908 and the two bearings 912, 916 shown. The thread 928 is preferably made from steel, Kevlar, or other material with high axial strength and minimal torsional resistance. Centripetal force of the spinning Heliogyro 100, 200 causes the shaft 904 to exert force outward (to the right, as shown). The thread 928 is intended to provide an equal and opposite force to the shaft 908, thus minimizing frictional forces including torsional resistance to the bearings 912, 916, improving torque feedback from the blade 108, and increasing bearing life.

Referring now to FIG. 10, a diagram illustrating Heliogyro deployed blade 108 details in accordance with embodiments of the present invention is shown. In general, a Heliogyro deployed blade 108 includes a long strip of material that is both flexible enough to be stored on a blade roll spool 704 of a blade deployer 116 and yet rigid enough, due to centripetal stiffness, to maintain shape and orientation when rotated. The blade material is so thin that it has essentially zero stiffness. The only "effective stiffness" is therefore due to centripetal force.

In the preferred embodiment, deployed blades 108 include one or more accelerometers at the distal or far end of the blade 108. In a preferred embodiment, two accelerometers are within a blade batten 1008 or other stiff material across the width of the blade tip 1016. Differential acceleration data from two accelerometers help to determine blade 108 twist at the blade tip 1016. Accelerometers in the blade tip 1016 either sends signals back to a blade deployer 116 or the spacecraft core 104, 204 through an RF signal or deposited wiring on the surface 1012 of the deployed blade 108. Accelerometers may provide information to the Heliogyro control system 2400 of what the blade tip 1016 is doing relative to the root of the blade 108, where the blade 108 joins the blade deployer 116. In one embodiment, the accelerometers may be gyroscopes or similar devices. In some embodiments, amplifiers spaced along a blade edge may be required to boost the accelerometer signals for accurate reception by the blade deployer 116 or spacecraft core 104, 204. In some embodiments, a miniature transmitter may be placed in close proximity to the accelerometers, such as a miniature radio transmitter co-located with the solar cells 1004, to transfer the required signals as previously described.

In order to provide power to the accelerometer, a power source is required. In one embodiment, solar cells 1004 are provided in proximity to the blade tip 1016. In another embodiment, solar cells 1004 may be provided at the blade root where the blade attaches to a blade deployer 116. However, for solar cells 1004 installed at a blade root, there would undoubtedly be resistive effects in wiring routed from the solar cells at the root to sensors at the tip, increasing the required voltage to power the accelerometers at the blade tip 1016.

In a preferred embodiment, blade edge stiffeners 1020 may be provided on one or both lengthwise edges of blades 108 and may be bonded directly to the blade 108 itself using Kevlar, polyimide, or similar material. In some embodiments, thin polyimide material with a residual stress differential may be fused to one side of the blade 108 material. Residual stress differential is a difference in stress between the front and back surfaces of blades 108, due to some chemical or physical process, that causes the material to roll up into a small, tight tube. One edge is permanently fused and the other has a temporary glue that weakens with time. When the weakened blade edge releases, the blade material rolls up into a cylindrical tube thus creating a stiffened edge. In other embodiments, blade edge stiffeners 1020 may be lengthwise tubes or STEM boom structures attached to the lengthwise blade edges. As the blades 108 deploy, the STEM boom rolls up into cylinders. Blade edge stiffeners 1020 may be uniform structures along the entire length of a deployed blade 108, or many sections of blade edge stiffeners 1020. Blade tip 1016 includes a blade batten 1008, which is a tubular structure across the width of the blade tip 1016 and attached to the blade tip 1016. The blade batten houses one or more accelerometers, and serves to resist tension/compression deformation due to the Poisson effect.

In the embodiment of many sections of blade edge stiffeners 1020, blade battens 1008 may be provided to transversely couple blade edge stiffeners 1020. In this way, the blade edge stiffeners 1020 and blade battens 1008 would form a "ladder" of structural support along the length of each deployed blade 108. Blade edge stiffeners 1020 and blade battens 1008 may be made of the same type of material, or different materials. Another benefit of the blade edge stiffeners 1020 is they may act as a rip-stop material to prevent cuts or punctures from severing the deployed blade 108.

Referring now to FIG. 11, a diagram illustrating Heliogyro blade clamp roller actuation steps 1100 in accordance with embodiments of the present invention is shown. The illustrated actuation steps proceed in chronological order from (A) through (E) during blade 108 deployment. If a blade 108 is being un-deployed or stowed on the blade deployer 116, the blade clamp roller 412 stays in position E and the blade deployment actuator 708 pulls the blade material between the blade clamp roller 412 and the blade roll spool 704, thus keeping the blade 108 taut as it wraps around the blade roll spool 704.

Step (A) illustrates the relationship between the blade roll 416 and the blade clamp roller 412 prior to the blade being deployed 1116. The blade clamp roller 412 is in a far rear position (i.e. oriented toward the spacecraft core 104, 204, and is not engaged with the blade roll 416. At this point, the entire blade 108 is stored on the blade roll 416.

The sequence of steps (B) through (E) illustrate the relationship between the blade clamp roller 412 and the blade roll 416 after the blade 108 has been either partially or fully deployed to a maximum length 1120. A spring-loaded arm 1112 is rotationally coupled under spring force from a wire spring 1104 to a roller support tab 1128 that engages the blade roll spool 704 (see FIG. 7). The wire spring 1104 drives the spring-loaded arm 1112 toward the blade roll spool 704. Before blade clamp roller 412 actuation, an actuator, mounted on the roller support tab 1128, engages the blade roll spool 704 and mechanically couples the roller support tab 1128 with the blade roll spool 704. As the blade deployment actuator 708 drives the blade roll spool 704 in the deploy direction, the roller support tab 1128 rotates as well, moving the spring-loaded arm 1112 and the blade clamp roller 412 "outward". The spring-loaded arm 1112 rides along a curved ramp 1108 that is mechanically coupled to the end caps 420, and is angled so that the spring-loaded arm 1112 causes the blade clamp roller 412 to be clamped to the blade roll spool 1124 at the end of blade clamp roller 412 actuation. In the middle of blade 108 deployment, the blade clamp roller 412 clamps to the blade 108 so it can be pitched, thus providing extra momentum as the blade 108 feeds out, which is used to keep the Heliogyro 100, 200 spin rate constant. In the preferred embodiment, the blade clamp roller 412 may also be disengaged from the blade roll 416 at any time, if desired. Alternately, a blade clamp roller 412 or bar can be rotated into position via an actuator-driven hinge point located elsewhere on the blade assembly yoke 512 or end caps 420. Alternately, an actuator may be included within the Roller Support Tab 1128 to select engagement/disengagement as required.

The blade clamp roller 412 is initially clamped to the blade roll 416, and is locked into place. During blade 108 deployment, the spring-loaded arm 1112 unlocks and back-drives a small amount to lift off the blade roll 416. After the blade 108 has unrolled, either partially or completely, and the blade clamp roller 412 needs to clamp the root of the blade 108, a linear actuator mounted on the roller support tab 1128 engages the blade roll spool 704, thus driving the spring-loaded arm 1112 forward. As it moves, the spring-loaded arm 1112 rotates inward, riding along the curved ramp 1108, and eventually resting the blade clamp roller 412 on the blade roll 416. Clamping holds blade 108 material at the root in place to allow for pitching of the blade 108. It also allows for reversing blade roll 416 motion in order to re-stow the blade 108.

The Heliogyro 100, 200 initially spins up to a spin rate that provides sufficient centripetal force to pull a first portion of the blades 108 out and keep the blades 108 radially extended. As the blades 108 feed out, the spin rate slows. At a certain point, when the spin rate is nearing a level that won't support controlled radial deployment, the blade clamp rollers 412 clamp the blades 108 and the blades 108 are pitched. Solar pressure is impacting the blades 108 constantly up to this point, but now, with the blades 108 pitched, the solar pressure adds angular momentum. The blades 108 can then be fed out at a rate that maintains the necessary spin rate, with margin, to ensure a controlled, radial deployment.

Referring now to FIG. 12, a diagram illustrating exemplary Heliogyro 100, 200 CubeSat configurations in accordance with embodiments of the present invention is shown. The illustrated configurations reflect a Heliogyro 100, 200 with four blade rolls 416 and blade deployers 116. For stowage, each blade 108 is rolled onto a blade roll spool 704 adjacent to its pitch actuator 408. The blade roll assemblies 416 and struts 112 fold up in three ways, depending on the CubeSat volume allocated: (A) along the bottom 2 U of a 6 U volume, (B) along opposite sides of the spacecraft core 104, 204, or (C) stacked on its end.

Referring now to FIG. 13, a diagram illustrating an exemplary Heliogyro 100, 200 CubeSat configuration after ejecting from a CubeSat canister in accordance with embodiments of the present invention is shown. A Heliogyro 100, 200 in CubeSat format must be ejected from a CubeSat canister of a space vehicle before the CubeSat can be deployed. FIG. 13 illustrates an example of an external appearance of a CubeSat Heliogyro 100, 200 prior to deployment. One side of the spacecraft core 104 is visible, with the bulk of the spacecraft core 104, 204 vertically oriented in the center of the CubeSat. The large sides of the CubeSat are solar panels of the power source 120, and the blade rolls 416 and blade deployers 116 are on the small sides of the CubeSat. In the embodiment illustrated, there are six blade deployers 116 and blade rolls 416.

Referring now to FIG. 14, a diagram illustrating an exemplary Heliogyro 100, 200 CubeSat configuration after deploying solar panels 120 in accordance with embodiments of the present invention is shown. The power source 120, shown as solar panels, are hinged at the top surfaces in a "gull wing" configuration and attached to the spacecraft core 104, 204. This frees up space for the blade deployers 116 and blade rolls 416 to be extended by struts 112 (not shown), prior to the blades 108 being deployed. Once the power source 120 is deployed, the solar panels are in a planar configuration.

Referring now to FIG. 15, a diagram illustrating exemplary Heliogyro 100 CubeSat strut 112 deployment in accordance with embodiments of the present invention is shown. In the illustrated embodiment, each of the struts 112 is composed of a number of hinged segments which are stored in a folded configuration on the CubeSat. In one embodiment, each of the struts 112 is stored in a roll, and are unrolled to a fully extended length. In another embodiment, each of the struts 112 are STEM booms. In another embodiment, each of the struts 112 is longitudinally collapsed for stowage, and extend outward for deployment. In one embodiment, each of the strut 112 segments are spring-actuated. Once the power source 120 has been deployed and is out of the way, the spacecraft core 104 rotates each of the struts 112 to provide equal spacing between each of the struts 112.

Referring now to FIG. 16, a diagram illustrating an exemplary Heliogyro 100, 200 CubeSat configuration after fully extending struts 112 in accordance with embodiments of the present invention is shown. Each of the struts 112 are extended to a maximum length. The length is predetermined, and is generally 1 to 3% of the total blade 108 length. At this step, propulsion units on the struts 112, such as propulsion modules 304, detumble the Heliogyro 100, 200 and point it toward the sun.

Referring now to FIG. 17, a diagram illustrating an exemplary Heliogyro 100, 200 CubeSat configuration with aligned blade deployers 116 in accordance with embodiments of the present invention is shown. The spacecraft core 104 rotates each of the blade deployers 116 90° such that deployed blades 108 will be normal to the sun. While maintaining a lock on the sun, the propulsion units 304 spin up the Heliogyro 100, 200 to a first spin rate, preferably 60 revolutions per minute. A practical minimum spin rate ensures sufficient centripetal force to pull the blades 108 outward, off of the blade roll 416. A practical maximum spin rate keeps the stress in the blades 108 below safe limits. These are a function of the weight of the blade tip batten assembly 1008 (the weight at the blade tip 1016). 60 rpm is sufficient to deploy the blades 108 a significant distance of the way before having to pitch the blades 108 and allow solar pressure to boost angular momentum. This advantageously cuts down on required deployment time.

Referring now to FIG. 18, a diagram illustrating an exemplary Heliogyro 100, 200 CubeSat configuration with fully deployed blades 108 in accordance with embodiments of the present invention is shown. Once the blade deployers 116 have been aligned, the blades 108 feed out in a controlled, balanced manner. The feed rate is sufficiently slow to maintain a positive trailing edge stress in the blades 108, thus guaranteeing a smooth, radial deployment. If the blades 108 feed out too fast, they bend backward with respect to the spin direction. This is because the trailing edge no longer has tension, but is placed into compression. Coriolis forces cause the blades 108 to lag behind the rotation of the Heliogyro 100, 200. This is countered by radial centripetal stress, but the spin rate is limited to a certain amount.

During deployment, the Heliogyro 100, 200 slows to its operating spin rate, or second spin rate, at which time the blades 108 collectively pitch as directed by the control system 2400. The spin rate may be on the order of 1 rpm, however, for blades 108 less than 1000 meters long. The operating or second spin rate is chosen to limit blade 108 coning (droop out of plane) to a certain amount, which in turn limits the coupling between blade twist, in-plane deflection, and out-of-plane deflection. It is also chosen to still allow adequate precession rates to aid maneuverability.

For the rest of the deployment, solar pressure on the blades 108 boosts the angular momentum while the blades 108 feed out at a speed necessary to maintain a constant spin rate. As the blades 108 feed out, if solar pressure doesn't act to boost it, the angular momentum is constant. This means the spin rate slows as the blades 108 deploy. The change in spin rate is calculated by taking the initial angular momentum, with the blades 108 at a certain length, and then setting the momentum equal to the equation for angular momentum if the blades 108 are longer. The equation will show that, if moment of inertia is larger (as is the case when the blades 108 are extended out farther), then the spin rate is less. Knowing how the spin rate varies, allows one to determine how much the blades 108 need to be pitched to support a certain blade feedout rate.

Referring now to FIG. 19, a diagram illustrating an exemplary alternative Heliogyro 100, 200 CubeSat storage arrangement in accordance with embodiments of the present invention is shown. The Heliogyro 100, 200 configuration illustrated in FIG. 19 shows four blade deployers 116, with each blade deployer 116 including a blade clamp roller 412 and a pitch actuator 408.

Referring now to FIG. 20, a diagram illustrating damper locations for an alternative Heliogyro 100, 200 configuration in accordance with embodiments of the present invention is shown. FIG. 20 shows a structural support 2008 and four in-plane and out-of-plane dampers 2004, as well as rolled up struts 112 for each of the blade deployers 116 and blades 108. The in-plane and out-of-plane damper assemblies 2004 are either passive or active. The passive damper configurations have springs and damper materials, either in series or parallel, that act to dampen unwanted motion. They can also have coils of wires and magnets that resist and dampen motion due to electromotive force generated as a magnet moves with respect to a wire. Active damper configurations are similar to voice coils or some other motor configuration. When back-driven, or driven against the powered direction of the motor or actuator, they encounter resistance. By tuning the resistance of the coil, motor, and voltage applied to the active damper motor circuit, the amount of damping is tuned to an optimal level.

Referring now to FIG. 21, a flowchart illustrating a process 2100 for deploying a Heliogyro in accordance with embodiments of the present invention is shown. Flow begins at block 2104.

At block 2104, a space vehicle ejects the Heliogyro 100, 200. In one embodiment, the Heliogyro 100, 200 is stored as a CubeSat. In another embodiment, the Heliogyro 100, 200 is stored as a non-CubeSat payload on a space vehicle. Flow continues to block 2108.

At block 2108, propulsion modules 304 detumble the Heliogyro 100, 200 and orient the Heliogyro 100, 200 toward the sun. The propulsion modules 304 are either mounted on struts 112 or blade deployers 116. The Heliogyro 100, 200 is oriented toward the sun when the blades 108, when deployed, are normal to the sun. Flow proceeds to block 2112 and block 2116.

At optional block 2112, for Heliogyros 100, 200 that include struts 112, each of the struts 112 are deployed and extended. When the struts 112 are deployed or extended (for example, per FIGS. 15 and 16), the struts 112 are unrolled, extended, or unfolded into a linear disposition. Some configurations of Heliogyro 100, 200, such as a ring configuration Heliogyro 200 that incorporates blade deployers 116 as the spacecraft core 204, may not include struts 112. Deployment may include rotating each of the struts 112 to maintain equal angular spacing between the struts 112. Flow proceeds to block 2116.

At block 2116, the Heliogyro control system 2400 spins the Heliogyro 100, 200 to a first spin rate, which in the preferred embodiment is approximately 60 RPM. The Heliogyro 100, 200 spins within a common plane generally defined by the spacecraft core 104, 204, struts 112, blade deployers 116, and blades 108. Flow proceeds to block 2120.

At block 2120, the Heliogyro control system 2400 begins to feed out each of the blades 108. As previously discussed, blades 108 are fed out at a predetermined rate in order to maintain a trailing edge stress on each of the blades 108. Flow proceeds to decision block 2124.

At decision block 2124, as the blades 108 are extending, the Heliogyro control system 2400 determines if the blade spin rate has achieved a second spin rate. In the preferred embodiment, the second spin rate is approximately one RPM. If the blade spin rate has not achieved the second spin rate, then flow proceeds to decision block 2124 to keep checking the spin rate. If the blade spin rate has achieved the second spin rate, then flow instead proceeds to block 2128.

At block 2128, the Heliogyro control system 2400 pitches the blades 108. In one embodiment, each of the blades 108 is pitched to a predetermined pitch angle. Flow proceeds to block 2132.

At block 2132, the Heliogyro control system 2400 continues feeding out the blades 108 to a fully extended length. At this point, the Heliogyro 100, 200 is fully deployed and operational. Flow ends at block 2132.

Referring now to FIG. 22A, a diagram illustrating a Heliogyro Cyclic Pitch Maneuver in accordance with embodiments of the present invention is shown. FIG. 22A illustrates cyclic pitch, which results in in-plane thrust in a specific direction 2216. FIGS. 22A-22D also includes a Pitch Angle vs Time graph 2204, 2220, 2232, 2236 for the deployed blades 108, and assume a Heliogyro 100, 200 with thrust and spin direction as shown in FIG. 3. The horizontal line in the graph represents a pitch angle of 0°, where the blades 108 are unpitched. A dot at the Y-axis location indicates the pitch angle for the darkened (black) blade. All blades follow the same profile, albeit at different places on the profile. For example, the dark blade is at phase 0°. The next blade going counterclockwise is 30° ahead in phase. Its pitch angle is defined by the location on the pitch profile 1/12 of a period ahead in time (30° divided by 360°). The next blade proceeding counterclockwise is 60° ahead of the first blade and 30° ahead of the second blade.

The uniform motion of each blade 108 is due to its fundamental pitch frequency of approximately one cycle per Heliogyro 100, 200 revolution, which is the basic frequency at which the blades 108 are pitched. Amplitude of pitch is typically on the order of 10°, and ranges from 0° to 90°.

Referring now to FIG. 22B, a diagram illustrating a Heliogyro Collective-Cyclic Pitch Maneuver in accordance with embodiments of the present invention is shown. FIG. 22B illustrates collective-cyclic pitch, which changes the Heliogyro 100, 200 spin rate and precesses a spin vector for the Heliogyro 100, 200. The Heliogyro 100, 200 precesses, or rotates, its spin vector due to torque imparted by the sun impacting the blades 108 as they pitch along the pitch angle vs time profile 2220. Note that the collective, or average pitch angle vs time is offset from 0°. This offset can be either positive (above the line) or negative (below the line).

Referring now to FIG. 22C, a diagram illustrating a Heliogyro Collective Pitch Maneuver in accordance with embodiments of the present invention is shown. FIG. 22C illustrates collective pitch, which changes the Heliogyro 100, 200 spin rate 2224. Note that the pitch angle vs time is constant and offset from 0°—meaning the blades 108 are pitched and the pitch does not change during the maneuver.

Referring now to FIG. 22D, a diagram illustrating a Heliogyro Half-P Pitch Maneuver in accordance with embodiments of the present invention is shown. FIG. 22D illustrates half-P pitch, which precesses the Heliogyro 100, 200 spin vector. The Heliogyro 100, 200 precesses, or rotates, its spin vector due to torque imparted by the sun impacting the blades 108 as they pitch along the pitch angle vs time profile 2236. Note that the pitch angle vs time sinusoidally alternates between positive and negative over the duration of two rotational periods of the Heliogyro 100, 200—meaning the blades 108 change from positively pitched to unpitched (0°) to negatively pitched during the maneuver as the Heliogyro 100, 200 spins twice.

Referring now to FIG. 23, a block diagram illustrating a Heliogyro 104, 204 control device in accordance with embodiments of the present invention is shown. The Heliogyro control device 2300 is a computing device including one or more processors 2304 including any processing devices suitable for executing software applications such as Intel x86-compatible processors, embedded processors, mobile processors, and/or RISC processors.

Processor 2304 may include several devices including field-programmable gate arrays (FPGAs), memory controllers, North Bridge devices, and/or South Bridge devices. Although in most embodiments, processor 2304 fetches application 2320 program instructions from memory 2312, it should be understood that processor 2304 and application 2320 may be configured in any allowable hardware/software configuration, including pure hardware configurations implemented in ASIC or FPGA forms. Memory 2312 also includes an operating system and metadata 2316, which includes parameters and data structures used to perform the processes of the present application, including predetermined values and parameters in various forms described herein.

The Heliogyro control device 2300 includes memory 2312, which may include one or both of volatile and nonvolatile memory types. In some embodiments, the memory 2312 includes firmware which includes program instructions that processor 2304 fetches and executes, including program instructions for the operating system and software applications 2320 of the present application. Examples of non-volatile memory 2312 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 2312 stores various data structures and user data. Examples of volatile memory 2312 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory. Stored within memory 2312 is metadata 2316 and one or more applications 2320. Metadata 2316 includes data structures and parameters of the present application, including but not limited to configuration parameters, predetermined values and time settings, and information required to control a Heliogyro 100, 200.

The Heliogyro control device 2300 may include a receiver 2324 to receive accelerometer data 2332 from accelerometers at each blade tip 1016, blade actuator data 2336 from encoders, potentiometers, or dampers, and position, attitude, and velocity data 2340 from a spacecraft navigation system 2432, an earth-based system 2420, space vehicles, satellites, or other spacecraft or any other information required to control a Heliogyro 100, 200.

The Heliogyro control device 2300 may also include a transmitter 2328 to transmit blade actuator controls 2344 to each blade actuator 124, blade deployment actuator controls 2348 to each blade deployment actuator 708, and propulsion module controls 2352 to each propulsion module 304.

The Heliogyro control device 2300 may also include one or more communication transceivers 2308, which is coupled to an onboard antenna (not shown) in order to transmit or receive data from earth-based stations 2420, space vehicles, satellites, or other spacecraft.

Referring now to FIG. 24, a diagram illustrating primary function flow for a Heliogyro control system 2400 in accordance with embodiments of the present invention is shown. The Heliogyro 100, 200 includes a proprietary Guidance, Navigation, and Control (GNC) system 2400 that autonomously provides supervised autonomy as it makes short-term trajectory decisions and course corrections. The four major components of the control system 2400 are trajectory generation 2408, thrust vector control 2412, blade pitch control 2416, and state determination 2404.

Relying on state history and ground-generated updates to the a priori mission plan, a trajectory-generating algorithm 2428 calculates an optimal trajectory to either maintain or to converge with a reference path. Hybrid systems theory, linear covariance analysis, and numerical targeting (shooting or collocation) may be used to calculate an updated trajectory. The trajectory-generating algorithm 2428 utilizes as inputs a mission plan or desired trajectory to follow Heliogyro 100, 200 parameters, dynamics equations, and past Heliogyro 100, 200 behavior. Past Heliogyro behavior includes the response to previous blade pitch amounts and blade damping forces and torques. Blade 108 pitch and blade 108 damping impart forces and torques to the Heliogyro 100, 200, which in turn precesses or rotates its spin vector, changes its spin rate, changes its direction of travel, changes its velocity, or changes modal vibrations. The Heliogyro 100, 200 learns what outputs result from inputs). The trajectory-generating algorithm 2428 creates future desired vehicle state outputs, including position, orientation, velocity, and angular velocity, and derivative of state, including acceleration and angular acceleration, vs. time.

The thrust vector controller 2412 receives current attitude, position, and velocity information 2424, as well as desired trajectory, to determine a pattern of maneuver parameters 2452 it will send to the blade pitch controller 2456. The thrust vector controller 2412 may in some embodiments utilize an inverse lookup table that maps 2448 desired maneuver parameters 2452 and current Heliogyro spin axis orientation to required thrust and moment 2444. If necessary, interim controllers can be applied in simulation, to iteratively revise the mappings until they are sufficient to control the Heliogyro 100, 200. New parameters are sent to the thrust vector controller 2412 at intervals of two Heliogyro 100, 200 rotations. A smooth transition (through the first derivative) is applied between past pitch parameters and current parameters. The thrust vector controller 2412 utilizes as inputs a current state, the desired state, and a derivative of the desired state. The thrust vector controller 2412 utilizes as outputs cyclic pitch amplitude, collective pitch amplitude, half-P pitch amplitude, pitch frequency, pitch phase, and an initial time for new parameters to be applied.

The blade pitch controller 2416 generates and tracks pitch profiles for the blade actuators 408. It receives maneuver parameters 2452 for collective pitch angle, cyclic pitch amplitude, and phase, and transitions from a current pitch profile to a new profile. A proprietary robust internal model controller, incorporating a modal model of the blade 108 assembly, pitches the blade 108 at the root while actively damping the first twist mode.

Certain inputs to the control system—attitude, position, and velocity 2424—come from a spacecraft navigation system 2432 (e.g., GEONS). It incorporates readings such as GPS, the Tracking and Data Relay Satellite System TDRSS, Doppler, and celestial navigation. In interplanetary space, the spacecraft navigation system 2432 typically relies primarily on celestial navigation and Doppler. The control system 2400 therefore benefits from highly accurate star tracking data 2436. FIG. 2 illustrates an embodiment incorporating a despin mechanism. An added benefit of a despun section is the ability to accommodate payloads that require a non-spinning platform. Also included in the control system 2400 are active in-plane and out-of-plane blade dampers (not shown), located where the struts 112 attach to the spacecraft core 104, 204.

The present invention allows the overlaying of active control pitch profiles. To limit Heliogyro 100, 200 wobble and other unwanted oscillations, techniques are incorporated from under-actuated robotics theory to optimize damping. The techniques layer certain damping profiles on top of pitch controls, as well as actuate the dampers at the blade 108 roots for a system-wide optimized damping effect. Also, by spinning blades 108, the spacecraft core 104, 204 can be rapidly precessed. (e.g., spin two blades spaced 180 degrees apart in opposite directions in relation to their respective local pitch axes, to quickly turn the Heliogyro 100, 200.

Referring now to FIG. 25, a block diagram illustrating Heliogyro control system model controllers in accordance with embodiments of the present invention is shown. The pitch actuators 124 utilize a robust internal model controller, with the pitch profile reference broken up into three parts: a Half-P pitch internal model controller 2504, a cyclic pitch internal model controller 2508, and a collective pitch internal model controller 2512. A modal model of the blades 108 in twist is incorporated into the plant 2516, which allows for active damping of the pitch modes.

Referring now to FIG. 26, a diagram illustrating Heliogyro despin mechanism 212 options in accordance with embodiments of the present invention is shown. A Heliogyro despin mechanism 212 may include an inner core 2604 coupled to an inner gimbal, where an actuator similar to a voice coil actuator discussed with reference to the pitch actuator 124 is used. One or two bearing races 2608 are positioned between the inner core 2604 and the inner gimbal to allow the inner core 2604 to rotate relative to the inner gimbal. Slip rings may be present between the various axes, except between the inner core 2604 and the inner gimbal.

Referring now to FIG. 27, a diagram illustrating a side view of a Heliogyro despin mechanism 212 in accordance with embodiments of the present invention is shown. The despin mechanism 212 may allow power and data to be wirelessly transferred between the spacecraft core 104, 204 and an inner gimbal receiver to power and control a despin actuator. The configuration can be altered to work in a CubeSat configuration.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel embodiment.

The descriptions and figures included herein depict specific embodiments to teach those skilled in the art how to make and use the best option. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method of controlling a spacecraft, comprising:
spinning the spacecraft to deploy a plurality of blades by centripetal force in response to the spinning;
calculating, by a control device, spacecraft position, attitude, and velocity, the spacecraft comprising a plurality of blade actuators controlling pitch for the plurality of blades, the plurality of blades extending radially away from a spacecraft core and comprising material configured to be defected by solar pressure;
receiving mission plan updates for the spacecraft;
calculating an updated trajectory based on the position, attitude, velocity, mission plan updates, and past spacecraft behavior;
generating maneuver parameters for the spacecraft from the updated trajectory;
creating new blade pitch profiles for a plurality of blade actuators, from the maneuver parameters;
sending controls corresponding to the new blade pitch profiles to the plurality of blade actuators; and
transitioning from current blade pitch profiles to the new blade pitch profiles.

2. The method of controlling a spacecraft of claim 1, wherein the mission plan updates for the spacecraft comprises instructions to either maintain or converge to a reference path in space.

3. The method of controlling a spacecraft of claim 1, wherein the control device receives position, attitude, and velocity from a spacecraft navigation system, wherein the spacecraft navigation system receives one or more of GPS readings, tracking and data relay satellite system readings, Doppler sensor readings, star tracker data, and celestial navigation readings and in response generates spacecraft position, attitude, and velocity.

4. The method of controlling a spacecraft of claim 1, wherein past spacecraft behavior comprises previous blade pitch amounts and blade damping forces and torques.

5. The method of controlling a spacecraft of claim 1, wherein the control device generates maneuver parameters at intervals of two spacecraft rotations, wherein generating maneuver parameters comprises:
mapping desired maneuver parameters and current spacecraft spin axis orientation to required thrust and moment through an inverse lookup table or algorithm.

6. The method of controlling a spacecraft of claim 1, wherein the current and new blade pitch profiles are based on collective pitch angle, cyclic pitch amplitude, and phase.

7. The method of controlling a spacecraft of claim 1, wherein the method further comprises:
overlaying active control pitch profiles on the new blade pitch profiles in order to generate damping effects for the spacecraft.

8. The method of controlling a spacecraft of claim 1, wherein the plurality of blades comprises thin-film solar arrays as a power source for the spacecraft.

9. The method of controlling a spacecraft of claim 1, wherein pairs of struts, blade deployers, and blades extend radially from the spacecraft core in opposite directions, wherein the spacecraft further comprises one or more propulsion modules on one or more struts or blade deployers of a pair of struts and blade deployers extending in first opposite directions, wherein the method further comprises:
   spinning the spacecraft at a predetermined spin rate with the one or more propulsion modules.

10. The method of controlling a spacecraft of claim 1, wherein the spacecraft core comprises:
   a segmented ring comprising a number of equal length segments equal to a number of blades in the plurality of blades, wherein each segment is joined to another segment at each end, wherein a root end of each strut is coupled to a segment.

11. The method of controlling a spacecraft claim 1, wherein the spacecraft further comprises an actuated despin mechanism disposed within a segmented ring and joined to opposite segments, the actuated despin mechanism comprising:
   an inner core,
   an inner gimbal, comprising an actuator; and
   a bearing race between the inner core and inner gimbal, wherein the method comprises:
      transmitting, by the spacecraft core, power and control data to the inner gimbal to control the actuated despin mechanism, or to communicate with avionics or payloads on a despun section of the spacecraft.

12. The method of controlling a spacecraft of claim 1, wherein each joint between segments comprises one or more active dampers to reduce at least one of in-plane and out-of-plane vibration.

13. The method of controlling a spacecraft of claim 12, comprising:
   providing blade pitch damping for each blade of the plurality of blades by a voice coil rotary actuator coupled to an encoder.

14. The method of controlling a spacecraft of claim 1, comprising:
   spinning the spacecraft by one of propulsion modules, a spinning apparatus that pre-spins the spacecraft as it is deployed, reaction wheels, or magnetic apparatuses.

15. The method of controlling a spacecraft of claim 1, comprising:
   determining an amount each blade of the plurality of blades is deployed by an optical sensor within a blade deployer reading an optical code on blade material.

16. The method of controlling a spacecraft of claim 1, comprising:
   clamping each blade of the plurality of blades during blade deployment; and
   pitching one or more blades of the plurality of blades as each blade feeds outward to maintain a spacecraft spin rate.

17. The method of controlling a spacecraft of claim 1, comprising:
   providing supervised autonomy of short-term trajectory decisions and spacecraft course corrections by a guidance, navigation, and control system of the spacecraft core.

18. The method of controlling a spacecraft of claim 1, comprising:
   breaking down a pitch profile reference into a half-P pitch, a cyclic pitch, and a collective pitch; and
   actuating pitch for each of the plurality of blades based on the half-P pitch, the cyclic pitch, and the collective pitch.

19. The method of controlling a spacecraft of claim 1, comprising:
   pitching each blade of the plurality of blades at a blade root while actively damping a first twist mode with a modal model of the blade.

20. The method of controlling a spacecraft of claim 1, comprising:
   determining a blade twist at a blade tip of each blade of the plurality of blades by providing blade tip motion data to the control device.

21. The method of controlling a spacecraft of claim 1, wherein after the spacecraft deploys the plurality of blades, the method comprising:
   rolling each blade of the plurality of blades on a spindle into an un-deployed state.

* * * * *